US012238728B2

United States Patent
Fan

(10) Patent No.: US 12,238,728 B2
(45) Date of Patent: Feb. 25, 2025

(54) DATA TRANSMISSION METHOD AND APPARATUS BASED ON A REPEAT TRANSMISSION SCHEME

(71) Applicant: HUAWEI TECHNOLOGIES CO., LTD., Guangdong (CN)

(72) Inventor: Bo Fan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 341 days.

(21) Appl. No.: 17/370,607

(22) Filed: Jul. 8, 2021

(65) Prior Publication Data

US 2021/0337524 A1    Oct. 28, 2021

Related U.S. Application Data

(63) Continuation of application No. PCT/CN2020/071248, filed on Jan. 9, 2020.

(30) Foreign Application Priority Data

Jan. 10, 2019 (CN) .......................... 201910024345.3

(51) Int. Cl.
  *H04W 72/23* (2023.01)
  *H04W 72/0453* (2023.01)
(52) U.S. Cl.
  CPC ....... *H04W 72/23* (2023.01); *H04W 72/0453* (2013.01)

(58) Field of Classification Search
  CPC ... H04L 1/0625; H04L 5/0035; H04L 1/0052; H04L 5/0048; H04L 5/0053; H04B 7/024; H04B 7/0408; H04W 72/23; H04W 72/0453
  See application file for complete search history.

(56) References Cited

U.S. PATENT DOCUMENTS

| 2014/0241287 A1 | 8/2014 | Cheng et al. |
| 2014/0247799 A1* | 9/2014 | Suzuki ................ H04J 13/22 370/329 |
| 2018/0302889 A1* | 10/2018 | Guo ................... H04W 72/046 |

(Continued)

FOREIGN PATENT DOCUMENTS

| CN | 102754364 A | 10/2012 |
| CN | 103580790 A | 2/2014 |

(Continued)

OTHER PUBLICATIONS

Extended European Search Report issued in European Application No. 20738178.1 on Feb. 9, 2022, 9 pages.

(Continued)

*Primary Examiner* — Benjamin H Elliott, IV
(74) *Attorney, Agent, or Firm* — Fish & Richardson P.C.

(57) ABSTRACT

Example data transmission methods and apparatus related to the field of communications technologies are described. One example method includes receiving, by a terminal based on a first transmission scheme, data sent by a network device, wherein the first transmission scheme is a data transmission scheme in which different redundancy versions (RV) of a same transport block (TB) are simultaneously transmitted by using two transmission configuration indicator (TCI) states.

20 Claims, 7 Drawing Sheets

(56) References Cited

U.S. PATENT DOCUMENTS

| | | | |
|---|---|---|---|
| 2019/0082456 A1* | 3/2019 | Kim | H04L 27/2602 |
| 2019/0313465 A1* | 10/2019 | Suzuki | H04J 13/22 |
| 2020/0015200 A1* | 1/2020 | Vilaipornsawai | H04W 72/23 |
| 2020/0028618 A1* | 1/2020 | Peng | H04L 1/0057 |
| 2020/0100225 A1* | 3/2020 | Khoshnevisan | H04L 5/0046 |
| 2020/0106559 A1* | 4/2020 | Vilaipornsawai | H04L 1/1896 |
| 2020/0205137 A1* | 6/2020 | Khoshnevisan | H04W 72/51 |
| 2020/0367208 A1* | 11/2020 | Khoshnevisan | H04L 5/0048 |
| 2021/0084623 A1* | 3/2021 | Zhang | H04L 5/0053 |
| 2021/0266944 A1* | 8/2021 | Noh | H04W 72/0453 |
| 2021/0307051 A1* | 9/2021 | Chatterjee | H04W 72/1273 |
| 2021/0314927 A1* | 10/2021 | Noh | H04L 5/0053 |
| 2021/0337524 A1* | 10/2021 | Fan | H04L 1/0625 |
| 2022/0045893 A1* | 2/2022 | Yamada | H04L 1/1896 |
| 2022/0095350 A1* | 3/2022 | Lee | H04L 5/00 |
| 2022/0158787 A1* | 5/2022 | Lee | H04L 5/0051 |

FOREIGN PATENT DOCUMENTS

| | | |
|---|---|---|
| CN | 103858503 A | 6/2014 |
| CN | 106160970 A | 11/2016 |
| CN | 107623541 A | 1/2018 |
| CN | 107733492 A | 2/2018 |
| CN | 108111275 A | 6/2018 |
| CN | 108418659 A | 8/2018 |
| CN | 108632192 A | 10/2018 |
| WO | 2016070428 A1 | 5/2016 |
| WO | 2018190617 A1 | 10/2018 |

OTHER PUBLICATIONS

Huawei, HiSilicon, "Discussion on multi-TRP/panel transmission for reliability and robustness in NR," 3GPP TSG RAN WG1 Meeting#94, Gothenburg, Sweden, Aug. 20-24, 2018, 5 pages.

Samsung, "Enhancement to Control Signaling," 3GPP TSG RAN WG1 Meeting #88bis, R1-1705302, Spokane, USA, Apr. 3-7, 2017, 3 pages.

3GPP TS 38.211 V15.3.0 (Sep. 2018), "3rd Generation Partnership Project; Technical Specification Group Radio Access Network; NR; Physical channels and modulation(Release 15)," Sep. 2018, 96 pages.

3GPP TS 38.212 V15.3.0 (Sep. 2018), "3rd Generation Partnership Project; Technical Specification Group Radio Access Network;NR; Multiplexing and channel coding(Release 15)," Sep. 2018, 99 pages.

3GPP TS 38.213 V15.3.0 (Sep. 2018), "3rd Generation Partnership Project; Technical Specification Group Radio Access Network; NR; Physical layer procedures for control(Release 15)," Sep. 2018, 101 pages.

3GPP TS 38.214 V15.3.0 (Sep. 2018), 3rd Generation Partnership Project; Technical Specification Group Radio Access Network; NR; Physical layer procedures for data (Release 15), 96 pages.

3GPP TS 38.306 V15.3.0 (Sep. 2018), "3rd Generation Partnership Project; Technical Specification Group Radio Access Network; NR; User Equipment (UE) radio access capabilities(Release 15)," Sep. 2018, 31 pages.

3GPP TS 38.331 V15.3.0 (Sep. 2018), 3rd Generation Partnership Project; Technical Specification Group Radio Access Network; NR; Radio Resource Control (RRC) protocol specification(Release 15), 445 pages.

Huawei, HiSilicon, "Enhancements on multi-TRP/panel transmission," 3GPP TSG RAN WG1 Meeting #95, R1-1812243, Spokane, USA, Nov. 12-16, 2018, 9 pages.

Huawei, HiSilicon, "TB repetition for HRLLC," 3GPP TSG-RAN WG2 Meeting #103, R2-1812076, Gothenburg, Sweden, Aug. 20-24, 2018, 2 pages.

Huang et al., "Reference signal design for demodulation of higher-order MU-MIMO in 3D-MIMO systems," 2015 IEEE/CIC International Conference on Communications in China, Jun. 29, 2017, 4 pages.

Li, "Research on the Technology of Latency Reduction for 5G," Beijing University of Posts and Telecommunications, Thesis for Master Degree, Jan. 24, 2018, 75 pages (with English abstract).

MediaTek Inc., "Multi-TRP and Multi-panel transmission," 3GPP TSG RAN WG1 Meeting #88bis, R-1704447, Spokane, USA, Apr. 3-7, 2017, 4 pages.

Office Action issued in Chinese Application No. 201910024345.3 on Mar. 2, 2021, 33 pages (with English translation).

PCT International Search Report and Written Opinion issued in International Application No. PCT/CN2020/071248 on Mar. 30, 2020, 16 pages (with English translation).

ZTE, "Enhancements on multi-TRP/Panel transmission," 3GPP TSG RAN WG1 Meeting #95, R1-1812256, Spokane, USA, Nov. 12-16, 2018, 14 pages.

* cited by examiner

DATA TRANSMISSION METHOD AND APPARATUS BASED ON A REPEAT TRANSMISSION SCHEME

CROSS-REFERENCE TO RELATED APPLICATIONS

This application is a continuation of International Application No. PCT/CN2020/071248, filed on Jan. 9, 2020, which claims priority to Chinese Patent Application No. 201910024345.3, filed on Jan. 10, 2019. The disclosures of the aforementioned applications are hereby incorporated by reference in their entireties.

TECHNICAL FIELD

This application relates to the field of communications technologies, and in particular, to a data transmission method and apparatus.

BACKGROUND

With development of communications technologies, in some scenarios of a 5th generation (5G) communications system, for example, in an ultra-reliable and low-latency communications (URLLC) service scenario, higher requirements are imposed on data transmission reliability. To improve data transmission reliability, in the 5G communications system, a terminal may transmit different redundancy versions (RV) of a same transport block (TB) in a plurality of consecutive time units, transmit one RV of the TB in each time unit, and map the RV of the TB to one transport layer. A base station combines and decodes data received in the plurality of time units, to improve a data receiving success rate and improve data transmission reliability.

SUMMARY

This application provides a data transmission method and apparatus, to improve data transmission efficiency while ensuring data transmission reliability.

To achieve the foregoing objective, this application provides the following methods and apparatuses described in a first part and a second part.

First Part:

A method for performing data transmission by using a spatial domain repeat transmission scheme is provided. The first part specifically includes a method provided in any one or more of the following first aspect to sixth aspect. The first part further provides a data transmission apparatus, which is specifically any one or more data transmission apparatuses provided in the following seventh aspect to twelfth aspect. The data transmission apparatuses provided in the seventh aspect to the twelfth aspect are respectively configured to implement data transmission methods provided in the first aspect to the sixth aspect.

According to the first aspect, a data transmission method is provided. The data transmission method includes: sending, by a network device, first indication information to a terminal, where the first indication information is used to indicate the network device to perform data transmission by using a spatial domain repeat transmission scheme; the spatial domain repeat transmission scheme is a transmission scheme in which N pieces of first data are sent in one time unit by using a plurality of beams; the N pieces of first data are generated based on a same piece of second data; and N is an integer greater than 1; and sending, by the network device, the N pieces of first data to the terminal in the time unit by using the plurality of beams.

The network device may send a plurality of pieces of first data by using one beam, or may send one piece of first data by using one beam, or may send one piece of first data by using a plurality of beams. It should be noted that a demodulation reference signal (DMRS) port, a transmission configuration indicator (TCI), a transmission reception point (TRP), a sounding reference signal resource indicator (SRI), a resource index of a channel state information reference signal (CSI-RS), an index of a synchronization signal/physical broadcast channel block (SS/PBCH) block, a resource index of a sounding reference signal (SRS), and a resource index of a tracking reference signal (TRS) each may represent a beam. Therefore, the beam herein may also be replaced with a DMRS port, a TCI, a TRP, an SRI, a resource index of a CSI-RS, an index of an SS/PBCH block, a resource index of an SRS, a resource index of a TRS, or the like. The descriptions in this paragraph are also applicable to any one of the following second aspect to sixth aspect, and details are not described again in the second aspect to the sixth aspect.

For example, the plurality of beams may be N DMRS ports or N TCIs. In this case, the network device sends the N pieces of first data in one time unit by using the N DMRS ports or the N TCIs, and the network device sends one piece of first data by using one DMRS port or one TCI. The descriptions in this paragraph are also applicable to any one of the following second aspect to sixth aspect, and details are not described again in the second aspect to the sixth aspect.

According to the method provided in the first aspect, the network device may send, in a same time unit by using a plurality of beams, a plurality of pieces of first data generated by using a same piece of second data. Compared with sending a plurality of different RVs of a same TB in a plurality of consecutive time units, this can reduce a data transmission delay and improve data transmission efficiency while ensuring data transmission reliability.

With reference to the first aspect, in a possible implementation, the second data is a TB, and the N pieces of first data correspond to a plurality of different RVs of the same piece of second data. In this possible implementation, the terminal may combine and decode the first data corresponding to the different RVs of the same piece of second data, thereby improving a decoding success rate.

With reference to the first aspect, in a possible implementation, the method further includes: sending, by the network device, second indication information to the terminal, where the second indication information is used to indicate an index of one of N RVs, the N RVs are in a one-to-one correspondence with the N pieces of first data, and an index of the first RV in the N RVs to an index of an $N^{th}$ RV in the N RVs satisfy a preset cyclic order. In this possible implementation, the terminal may learn, based on the second indication information and the preset cyclic order that the indexes of the N RVs satisfy, of the indexes of the RVs corresponding to the N pieces of first data, and the network device may not indicate the index of each RV, thereby saving transmission resources.

With reference to the first aspect, in a possible implementation, the method further includes: sending, by the network device, second indication information to the terminal, where the second indication information is used to indicate an index of an RV corresponding to each of the N pieces of first data. In this possible implementation, the terminal may directly determine, based on the second indication information, the indexes of the RVs corresponding to the N pieces of first data, and the terminal does not perform an additional operation, so that implementation complexity of the terminal can be reduced.

According to the second aspect, a data transmission method is provided. The data transmission method includes: sending, by a network device, second indication information to a terminal, where the second indication information is used to indicate an index of one of N RVs, the N RVs are in a one-to-one correspondence with N pieces of first data, an index of the first RV in the N RVs to an index of an $N^{th}$ RV in the N RVs satisfy a preset cyclic order, the N pieces of first data are first data sent by the network device in one time unit by using a plurality of beams, the N pieces of first data are generated based on a same piece of second data, and N is an integer greater than 1.

According to the method provided in the second aspect, the network device may send, in a same time unit by using a plurality of beams, a plurality of pieces of first data generated by using a same piece of second data. Compared with sending a plurality of different RVs of a same TB in a plurality of consecutive time units, this can reduce a data transmission delay and improve data transmission efficiency while ensuring data transmission reliability. In addition, the terminal may learn, based on the second indication information and the preset cyclic order that the indexes of the N RVs satisfy, of the indexes of the RVs corresponding to the N pieces of first data, and the network device may not indicate the index of each RV, thereby saving transmission resources.

With reference to the second aspect, in a possible implementation, before the sending, by a network device, second indication information to a terminal, the method further includes: generating, by the network device, the second indication information.

With reference to the second aspect, in a possible implementation, the second data is a TB, and the N pieces of first data correspond to a plurality of different RVs of the same piece of second data. In this possible implementation, the terminal may combine and decode the first data corresponding to the different RVs of the same piece of second data, thereby improving a decoding success rate.

According to a third aspect, a data transmission method is provided. The data transmission method includes: sending, by a network device, second indication information to a terminal, where the second indication information is used to indicate an index of an RV corresponding to each of N pieces of first data, the N pieces of first data are first data sent by the network device in one time unit by using a plurality of beams, the N pieces of first data are generated based on a same piece of second data, and N is an integer greater than 1.

According to the method provided in the third aspect, the network device may send, in a same time unit by using a plurality of beams, a plurality of pieces of first data generated by using a same piece of second data. Compared with sending a plurality of different RVs of a same TB in a plurality of consecutive time units, this can reduce a data transmission delay and improve data transmission efficiency while ensuring data transmission reliability. In addition, the terminal may directly determine, based on the second indication information, the indexes of the RVs corresponding to the N pieces of first data, and the terminal does not perform an additional operation, so that implementation complexity of the terminal can be reduced.

With reference to the third aspect, in a possible implementation, before the sending, by a network device, second indication information to a terminal, the method further includes: generating, by the network device, the second indication information.

With reference to the third aspect, in a possible implementation, the second indication information is carried in DCI, the DCI includes indexes of N RVs of a same TB, and the same TB is the same piece of second data.

With reference to the third aspect, in a possible implementation, the second data is a TB, and the N pieces of first data correspond to a plurality of different RVs of the same piece of second data. In this possible implementation, the terminal may combine and decode the first data corresponding to the different RVs of the same piece of second data, thereby improving a decoding success rate.

With reference to any method provided in any one of the first aspect to the third aspect, in a possible implementation, the method further includes: sending, by the network device, third indication information to the terminal, where the third indication information is used to indicate a quantity of DMRS ports used by the network device to send the first data in the time unit; or the third indication information is used to indicate a quantity of TRPs used by the network device to send the first data in the time unit, and the network device sends one piece of first data by using one TRP; or the third indication information is used to indicate a quantity of TCIs used by the network device to send the first data in the time unit; or the third indication information is used to indicate a quantity of the first data sent by the network device in the time unit; or the third indication information is used to indicate a quantity of different RVs corresponding to the first data sent by the network device in the time unit. In this possible implementation, the terminal can determine the quantity of the first data sent by the network device, to correctly receive the first data.

The third indication information and the first indication information may be same indication information, or may be different indication information.

According to the fourth aspect, a data transmission method is provided. The data transmission method includes: receiving, by a terminal, first indication information from a network device, where the first indication information is used to indicate the network device to perform data transmission by using a spatial domain repeat transmission scheme; the spatial domain repeat transmission scheme is a transmission scheme in which N pieces of first data are sent in one time unit by using a plurality of beams; the N pieces of first data are generated based on a same piece of second data; and N is an integer greater than 1; receiving, by the terminal, the N pieces of first data from the network device in the time unit based on the first indication information; and combining and decoding, by the terminal, the N pieces of received first data.

According to the method provided in the fourth aspect, the network device may send, in a same time unit by using a plurality of beams, a plurality of pieces of first data generated by using a same piece of second data, and the terminal may combine and decode the plurality of pieces of first data generated by using the same piece of second data, thereby improving a decoding success rate.

With reference to the fourth aspect, in a possible implementation, the second data is a TB, and the N pieces of first data correspond to a plurality of different RVs of the same piece of second data. In this possible implementation, the terminal may combine and decode the first data corresponding to the different RVs of the same piece of second data, thereby improving a decoding success rate.

With reference to the fourth aspect, in a possible implementation, the method further includes: receiving, by the terminal, second indication information from the network device, where the second indication information is used to indicate an index of one of N RVs, the N RVs are in a one-to-one correspondence with the N pieces of first data, and an index of the first RV in the N RVs to an index of an $N^{th}$ RV in the N RVs satisfy a preset cyclic order; and the combining and decoding, by the terminal, the N pieces of received first data includes: combining, by the terminal, the N pieces of received first data based on the second indication information, and decoding the N pieces of combined first data. In this possible implementation, the terminal may learn, based on the second indication information and the preset cyclic order that the indexes of the N RVs satisfy, of the indexes of the RVs corresponding to the N pieces of first data, and the network device may not indicate the index of each RV, thereby saving transmission resources.

With reference to the fourth aspect, in a possible implementation, the combining, by the terminal, the N pieces of received first data based on the second indication information includes: determining, by the terminal based on the second indication information and the preset cyclic order that the indexes of the N RVs satisfy, the index of the RV corresponding to each of the N pieces of first data; and combining, by the terminal, the N pieces of first data based on the index of the RV corresponding to each of the N pieces of first data. In this possible implementation, the terminal may learn, based on the second indication information and the preset cyclic order that the indexes of the N RVs satisfy, of the indexes of the RVs corresponding to the N pieces of first data, and the network device may not indicate the index of each RV, thereby saving transmission resources.

With reference to the fourth aspect, in a possible implementation, the method further includes: receiving, by the terminal, second indication information from the network device, where the second indication information is used to indicate an index of an RV corresponding to each of the N pieces of first data; and the combining and decoding, by the terminal, the N pieces of received first data includes: combining, by the terminal, the N pieces of received first data based on the second indication information, and decoding the N pieces of combined first data. In this possible implementation, the terminal may directly determine, based on the second indication information, the indexes of the RVs corresponding to the N pieces of first data, and the terminal does not perform an additional operation, so that implementation complexity of the terminal can be reduced.

With reference to the fourth aspect, in a possible implementation, the method further includes: receiving, by the terminal, third indication information from the network device, where the third indication information is used to indicate a quantity of DMRS ports used by the network device to send the first data in the time unit; or the third indication information is used to indicate a quantity of TRPs used by the network device to send the first data in the time unit, and the network device sends one piece of first data by using one TRP; or the third indication information is used to indicate a quantity of TCIs used by the network device to send the first data in the time unit; or the third indication information is used to indicate a quantity of the first data sent by the network device in the time unit; or the third indication information is used to indicate a quantity of different RVs corresponding to the first data sent by the network device in the time unit; and the receiving, by the terminal, the N pieces of first data from the network device in the time unit based on the first indication information includes: receiving, by the terminal, the N pieces of first data from the network device in the time unit based on the first indication information and the third indication information.

The third indication information and the first indication information may be same indication information, or may be different indication information.

According to a fifth aspect, a data transmission method is provided. The data transmission method includes: receiving, by a terminal, second indication information from a network device, where the second indication information is used to indicate an index of one of N RVs, the N RVs are in a one-to-one correspondence with N pieces of first data, an index of the first RV in the N RVs to an index of an $N^{th}$ RV in the N RVs satisfy a preset cyclic order, the N pieces of first data are first data sent by the network device in one time unit by using a plurality of beams, the N pieces of first data are generated based on a same piece of second data, and N is an integer greater than 1; and combining, by the terminal, the N pieces of received first data based on the second indication information, and decoding the N pieces of combined first data.

According to the method provided in the fifth aspect, the network device may send, in a same time unit by using a plurality of beams, a plurality of pieces of first data generated by using a same piece of second data, and the terminal may combine and decode the plurality of pieces of first data generated by using the same piece of second data, thereby improving a decoding success rate. In addition, the terminal may learn, based on the second indication information and the preset cyclic order that the indexes of the N RVs satisfy, of the indexes of the RVs corresponding to the N pieces of first data, and the network device may not indicate the index of each RV, thereby saving transmission resources.

With reference to the fifth aspect, in a possible implementation, the second data is a TB, and the N pieces of first data correspond to a plurality of different RVs of the same piece of second data. In this possible implementation, the terminal may combine and decode the first data corresponding to the different RVs of the same piece of second data, thereby improving a decoding success rate.

With reference to the fifth aspect, in a possible implementation, the combining, by the terminal, the N pieces of received first data based on the second indication information includes: determining, by the terminal based on the second indication information and the preset cyclic order that the indexes of the N RVs satisfy, the index of the RV corresponding to each of the N pieces of first data; and combining, by the terminal, the N pieces of first data based on the index of the RV corresponding to each of the N pieces of first data.

According to a sixth aspect, a data transmission method is provided. The data transmission method includes: receiving, by a terminal, second indication information from the network device, where the second indication information is used to indicate an index of an RV corresponding to each of N pieces of first data, the N pieces of first data are first data sent by the network device in one time unit by using a plurality of beams, the N pieces of first data are generated based on a same piece of second data, and N is an integer greater than 1; and combining, by the terminal, the N pieces of received first data based on the second indication information, and decoding the N pieces of combined first data.

According to the method provided in the sixth aspect, the network device may send, in a same time unit by using a plurality of beams, a plurality of pieces of first data generated by using a same piece of second data, and the terminal may combine and decode the plurality of pieces of first data generated by using the same piece of second data, thereby improving a decoding success rate. In addition, the terminal may directly determine, based on the second indication information, the indexes of the RVs corresponding to the N pieces of first data, and the terminal does not perform an additional operation, so that implementation complexity of the terminal can be reduced.

With reference to the sixth aspect, in a possible implementation, the second indication information is carried in DCI, the DCI includes indexes of N RVs of a same TB, and the same TB is the same piece of second data.

With reference to the sixth aspect, in a possible implementation, the second data is a TB, and the N pieces of first data correspond to a plurality of different RVs of the same piece of second data. In this possible implementation, the terminal may combine and decode the first data corresponding to the different RVs of the same piece of second data, thereby improving a decoding success rate.

With reference to either of the methods provided in the fifth aspect and the sixth aspect, in a possible implementation, the method further includes: receiving, by the terminal, third indication information from the network device, where the third indication information is used to indicate a quantity of DMRS ports used by the network device to send the first data in the time unit; or the third indication information is used to indicate a quantity of TRPs used by the network device to send the first data in the time unit, and the network device sends one piece of first data by using one TRP; or the third indication information is used to indicate a quantity of TCIs used by the network device to send the first data in the time unit; or the third indication information is used to indicate a quantity of the first data sent by the network device in the time unit; or the third indication information is used to indicate a quantity of different RVs corresponding to the first data sent by the network device in the time unit; and receiving, by the terminal, the N pieces of first data from the network device in the time unit based on the third indication information.

According to the seventh aspect, a data transmission apparatus is provided. The data transmission apparatus includes a communications unit and a processing unit. The processing unit is configured to send first indication information to a terminal through the communications unit, where the first indication information is used to indicate the data transmission apparatus to perform data transmission by using a spatial domain repeat transmission scheme; the spatial domain repeat transmission scheme is a transmission scheme in which N pieces of first data are sent in one time unit by using a plurality of beams, the N pieces of first data are generated based on a same piece of second data; and N is an integer greater than 1. The processing unit is further configured to send the N pieces of first data to the terminal in the time unit through the communications unit by using the plurality of beams.

The data transmission apparatus may send a plurality of pieces of first data by using one beam, or may send one piece of first data by using one beam, or may send one piece of first data by using a plurality of beams. It should be noted that a DMRS port, a TCI, a TRP, an SRI, a resource index of a CSI-RS, an index of an SS/PBCH block, a resource index of an SRS, and a resource index of a TRS each may represent a beam. Therefore, the beam herein may also be replaced with a DMRS port, a TCI, a TRP, an SRI, a resource index of a CSI-RS, an index of an SS/PBCH block, a resource index of an SRS, a resource index of a TRS, or the like. The descriptions in this paragraph are also applicable to the following eighth aspect and ninth aspect, and details are not described again in the eighth aspect and the ninth aspect.

For example, the plurality of beams may be N DMRS ports or N TCIs. In this case, the data transmission apparatus sends the N pieces of first data in one time unit by using the N DMRS ports or the N TCIs, and the data transmission apparatus sends one piece of first data by using one DMRS port or one TCI. The descriptions in this paragraph are also applicable to the following eighth aspect and ninth aspect, and details are not described again in the eighth aspect and the ninth aspect.

With reference to the seventh aspect, in a possible implementation, the second data is a TB, and the N pieces of first data correspond to a plurality of different RVs of the same piece of second data.

With reference to the seventh aspect, in a possible implementation, the processing unit is further configured to send second indication information to the terminal through the communications unit, where the second indication information is used to indicate an index of one of N RVs, the N RVs are in a one-to-one correspondence with the N pieces of first data, and an index of the first RV in the N RVs to an index of an $N^{th}$ RV in the N RVs satisfy a preset cyclic order.

With reference to the seventh aspect, in a possible implementation, the processing unit is further configured to send the second indication information to the terminal through the communications unit, where the second indication information is used to indicate an index of an RV corresponding to each of the N pieces of first data.

According to the eighth aspect, a data transmission apparatus is provided. The data transmission apparatus includes a communications unit and a processing unit. The processing unit is configured to send second indication information to a terminal through the communications unit, where the second indication information is used to indicate an index of one of N RVs, the N RVs are in a one-to-one correspondence with N pieces of first data, an index of the first RV in the N RVs to an index of an $N^{th}$ RV in the N RVs satisfy a preset cyclic order, the N pieces of first data are first data sent by the data transmission apparatus in one time unit by using a plurality of beams, the N pieces of first data are generated based on a same piece of second data, and N is an integer greater than 1.

With reference to the eighth aspect, in a possible implementation, the processing unit is further configured to generate the second indication information.

With reference to the eighth aspect, in a possible implementation, the second data is a TB, and the N pieces of first data correspond to a plurality of different RVs of the same piece of second data.

According to the ninth aspect, a data transmission apparatus is provided. The data transmission apparatus includes a communications unit and a processing unit. The processing unit is configured to send second indication information to a terminal through the communications unit, where the second indication information is used to indicate an index of an RV corresponding to each of the N pieces of first data, the N pieces of first data are first data sent by the data transmission apparatus in one time unit by using a plurality of beams, the N pieces of first data are generated based on a same piece of second data, and N is an integer greater than 1.

With reference to the ninth aspect, in a possible implementation, the processing unit is further configured to generate the second indication information.

With reference to the ninth aspect, in a possible implementation, the second indication information is carried in DCI, the DCI includes indexes of N RVs of a same TB, and the same TB is the same piece of second data.

With reference to the ninth aspect, in a possible implementation, the second data is a TB, and the N pieces of first data correspond to a plurality of different RVs of the same piece of second data.

With reference to any apparatus provided in any one of the seventh aspect to the ninth aspect, in a possible implementation, the processing unit is further configured to send third indication information to the terminal through the communications unit, where the third indication information is used to indicate a quantity of DMRS ports used by the data transmission apparatus to send the first data in the time unit; or the third indication information is used to indicate a quantity of TRPs used by the data transmission apparatus to send the first data in the time unit, and the data transmission apparatus sends one piece of first data by using one TRP; or the third indication information is used to indicate a quantity of TCIs used by the data transmission apparatus to send the first data in the time unit; or the third indication information is used to indicate a quantity of the first data sent by the data transmission apparatus in the time unit; or the third indication information is used to indicate a quantity of different RVs corresponding to the first data sent by the data transmission apparatus in the time unit.

The third indication information and the first indication information may be same indication information, or may be different indication information.

According to a tenth aspect, a data transmission apparatus is provided. The data transmission apparatus includes a communications unit and a processing unit. The communications unit is configured to receive first indication information from a network device, where the first indication information is used to indicate the network device to perform data transmission by using a spatial domain repeat transmission scheme; the spatial domain repeat transmission scheme is a transmission scheme in which N pieces of first data are sent in one time unit by using a plurality of beams; the N pieces of first data are generated based on a same piece of second data; and N is an integer greater than 1. The processing unit is configured to receive the N pieces of first data from the network device in the time unit through the communications unit based on the first indication information. The processing unit is further configured to combine and decode the N pieces of received first data.

The network device may send a plurality of pieces of first data by using one beam, or may send one piece of first data by using one beam, or may send one piece of first data by using a plurality of beams. It should be noted that a DMRS port, a TCI, a TRP, an SRI, a resource index of a CSI-RS, an index of an SS/PBCH block, a resource index of an SRS, and a resource index of a TRS each may represent a beam. Therefore, the beam herein may also be replaced with a DMRS port, a TCI, a TRP, an SRI, a resource index of a CSI-RS, an index of an SS/PBCH block, a resource index of an SRS, a resource index of a TRS, or the like. The descriptions in this paragraph are also applicable to the following eleventh aspect and twelfth aspect, and details are not described again in the eleventh aspect and the twelfth aspect.

For example, the plurality of beams may be N DMRS ports or N TCIs. In this case, the network device sends the N pieces of first data in one time unit by using the N DMRS ports or the N TCIs, and the network device sends one piece of first data by using one DMRS port or one TCI. The descriptions in this paragraph are also applicable to the following eleventh aspect and twelfth aspect, and details are not described again in the eleventh aspect and the twelfth aspect.

With reference to the tenth aspect, in a possible implementation, the second data is a TB, and the N pieces of first data correspond to a plurality of different RVs of the same piece of second data.

With reference to the tenth aspect, in a possible implementation, the communications unit is further configured to receive second indication information from the network device, where the second indication information is used to indicate an index of one of N RVs, the N RVs are in a one-to-one correspondence with the N pieces of first data, and an index of the first RV in the N RVs to an index of an $N^{th}$ RV in the N RVs satisfy a preset cyclic order; and the processing unit is specifically configured to: combine the N pieces of received first data based on the second indication information, and decode the N pieces of combined first data.

With reference to the tenth aspect, in a possible implementation, the processing unit is specifically configured to: determine, based on the second indication information and the preset cyclic order that the indexes of the N RVs satisfy, the index of the RV corresponding to each of the N pieces of first data; and combine the N pieces of first data based on the index of the RV corresponding to each of the N pieces of first data.

With reference to the tenth aspect, in a possible implementation, the communications unit is further configured to receive second indication information from the network device, where the second indication information is used to indicate an index of an RV corresponding to each of the N pieces of first data and the processing unit is specifically configured to: combine the N pieces of received first data based on the second indication information, and decode the N pieces of combined first data.

With reference to the tenth aspect, in a possible implementation, the communications unit is further configured to receive third indication information from the network device, the third indication information is used to indicate a quantity of DMRS ports used by the network device to send the first data in the time unit; or the third indication information is used to indicate a quantity of TRPs used by the network device to send the first data in the time unit, and the network device sends one piece of first data by using one TRP; or the third indication information is used to indicate a quantity of TCIs used by the network device to send the first data in the time unit; or the third indication information is used to indicate a quantity of the first data sent by the network device in the time unit; or the third indication information is used to indicate a quantity of different RVs corresponding to the first data sent by the network device in the time unit; and the processing unit is specifically configured to receive the N pieces of first data from the network device in the time unit through the communications unit based on the first indication information and the third indication information.

The third indication information and the first indication information may be same indication information, or may be different indication information.

According to the eleventh aspect, a data transmission apparatus is provided. The data transmission apparatus includes a communications unit and a processing unit. The communications unit is configured to receive second indication information from a network device, where the second indication information is used to indicate an index of one of N RVs, the N RVs are in a one-to-one correspondence with the N pieces of first data, an index of the first RV in the N RVs to an index of an $N^{th}$ RV in the N RVs satisfy a preset cyclic order, the N pieces of first data are first data sent by the network device in one time unit by using a plurality of beams, the N pieces of first data are generated based on a same piece of second data, and N is an integer greater than 1. The processing unit is configured to: combine the N pieces of received first data based on the second indication information, and decode the N pieces of combined first data.

With reference to the eleventh aspect, in a possible implementation, the second data is a TB, and the N pieces of first data correspond to a plurality of different RVs of the same piece of second data.

With reference to the eleventh aspect, in a possible implementation, the processing unit is specifically configured to: determine, based on the second indication information and the preset cyclic order that the indexes of the N RVs satisfy, the index of the RV corresponding to each of the N pieces of first data; and combine the N pieces of first data based on the index of the RV corresponding to each of the N pieces of first data.

According to the twelfth aspect, a data transmission apparatus is provided. The data transmission apparatus includes a communications unit and a processing unit. The communications unit is configured to receive second indication information from the network device, where the second indication information is used to indicate an index of an RV corresponding to each of the N pieces of first data, the N pieces of first data are first data sent by the network device in one time unit by using a plurality of beams, the N pieces of first data are generated based on a same piece of second data, and N is an integer greater than 1. The processing unit is configured to: combine the N pieces of received first data based on the second indication information, and decode the N pieces of combined first data.

With reference to the twelfth aspect, in a possible implementation, the second indication information is carried in DCI, the DCI includes indexes of N RVs of a same TB, and the same TB is the same piece of second data.

With reference to the twelfth aspect, in a possible implementation, the second data is a TB, and the N pieces of first data correspond to a plurality of different RVs of the same piece of second data.

With reference to either of the apparatuses provided in the eleventh aspect and the twelfth aspect, in a possible implementation, the communications unit is further configured to receive third indication information from the network device, the third indication information is used to indicate a quantity of DMRS ports used by the network device to send the first data in the time unit, or the third indication information is used to indicate a quantity of TRPs used by the network device to send the first data in the time unit, and the network device sends one piece of first data by using one TRP; or the third indication information is used to indicate a quantity of TCIs used by the network device to send the first data in the time unit; or the third indication information is used to indicate a quantity of the first data sent by the network device in the time unit; or the third indication information is used to indicate a quantity of different RVs corresponding to the first data sent by the network device in the time unit; and the processing unit is configured to receive the N pieces of first data from the network device in the time unit through the communications unit based on the third indication information.

For the descriptions of the second aspect, the third aspect, the fifth aspect, and the sixth aspect in the foregoing embodiments, refer to related descriptions in Description of embodiments. For beneficial effects of different implementations of the seventh aspect to the twelfth aspect, refer to beneficial effects of corresponding implementations of the first aspect to the sixth aspect. Details are not described herein again.

In the foregoing embodiments, an example in which the provided method is applied to downlink data (that is, the network device sends the first data by using the spatial domain repeat transmission scheme) is used to describe the method provided in this application. During actual implementation, the foregoing method may also be applied to uplink data (that is, the terminal sends the first data by using the spatial domain repeat transmission scheme). In this case, the actions performed by the network device in the first aspect to the sixth aspect may be performed by the terminal, and the actions performed by the terminal in the first aspect to the sixth aspect may be performed by the network device. In addition, a repeat transmission scheme to be used by the terminal may be indicated by the network device, or may be determined by the terminal and then notified to the network device.

Second Part:

A method for performing data transmission by using a space-time repeat transmission scheme is provided. The second part specifically includes a method provided in any one or more of the following thirteenth aspect to twentieth aspect. The second part further provides a data transmission apparatus, which is specifically any one or more data transmission apparatuses provided in the following twenty-first aspect to twenty-eighth aspect. The data transmission apparatuses provided in the twenty-first aspect to the twenty-eighth aspect are respectively configured to implement data transmission methods provided in the thirteenth aspect to the twentieth aspect.

According to the thirteenth aspect, a data transmission method is provided. The data transmission method includes: sending, by a network device, first indication information to a terminal, where the first indication information is used to indicate the network device to perform data transmission by using a space-time repeat transmission scheme, and the space-time repeat transmission scheme is a transmission scheme in which first data is sent in M time units by using a plurality of beams; sending, by the network device, a plurality of pieces of first data in at least one of the M time units by using a plurality of beams, where all the first data sent in the M time units is generated based on a same piece of second data, and M is an integer greater than 1; and sending, by the network device, a plurality of pieces of first data to the terminal in the M time units by using a plurality of beams.

Quantities of first data sent by the network device in different time units may be the same, or may be different. In one time unit, the network device may send a plurality of pieces of first data by using one beam, or may send one piece of first data by using one beam, or may send one piece of first data by using a plurality of beams. It should be noted that a DMRS port, a TCI, a TRP, an SRI, a resource index of a CSI-RS, an index of an SS/PBCH block, a resource index of an SRS, and a resource index of a TRS each may represent a beam. Therefore, the beam herein may also be replaced with a DMRS port, a TCI, a TRP, an SRI, a resource index of a CSI-RS, an index of an SS/PBCH block, a resource index of an SRS, a resource index of a TRS, or the like. The descriptions in this paragraph are also applicable to any one of the following fourteenth aspect to twentieth aspect, and details are not described again in the fourteenth aspect to the twentieth aspect.

For example, a plurality of beams for sending the first data in one time unit may be N DMRS ports or N TCIs. In this case, the network device sends N pieces of first data in each time unit by using the N DMRS ports or the N TCIs, and the network device sends one piece of first data by using one DMRS port or one TCI. The descriptions in this paragraph are also applicable to any one of the following fourteenth aspect to twentieth aspect, and details are not described again in the fourteenth aspect to the twentieth aspect.

According to the method provided in the thirteenth aspect, the network device sends, in one of a plurality of time units by using at least a plurality of beams, a plurality of pieces of first data generated by using a same piece of second data. Compared with sending a plurality of different RVs of a same TB in a plurality of consecutive time units, this can reduce a data transmission delay and improve data transmission efficiency while ensuring data transmission reliability.

With reference to the thirteenth aspect, in a possible implementation, the second data is a TB, and the N pieces of first data sent by the network device in each of the M time units correspond to a plurality of different RVs of the same piece of second data; or the second data is a TB, the N pieces of first data sent by the network device in each of the M time units correspond to a same RV of the same piece of second data, and first data sent by the network device in different time units in the M time units corresponds to a plurality of different RVs of the same piece of second data. In this possible implementation, the terminal may combine and decode the first data corresponding to the different RVs of the same piece of second data, thereby improving a decoding success rate.

With reference to the thirteenth aspect, in a possible implementation, the method further includes: sending, by the network device, second indication information to the terminal, where the second indication information is used to indicate an index of one of M*N RVs; the M*N RVs are in a one-to-one correspondence with M*N pieces of first data; the M*N pieces of first data are all the first data sent by the network device in the M time units; and an index of the first RV in the M*N RVs to an index of an M*N$^{th}$ RV in the M*N RVs satisfy a preset cyclic order; or sending, by the network device, second indication information to the terminal, where the second indication information is used to indicate an index of one of M RVs; an index of the first RV in the M RVs to an index of an M$^{th}$ RV in the M RVs satisfy a preset cyclic order; an m$^{th}$ RV in the M RVs is an RV corresponding to N pieces of first data sent by the network device in an m$^{th}$ time unit in the M time units; an index of an RV corresponding to the N pieces of first data sent by the network device in each of the M time units is the same; and m is an integer greater than 0 and less than or equal to M. In this possible implementation, the terminal may learn, based on the second indication information and the preset cyclic order that the indexes of the M*N RVs satisfy, of the indexes of the RVs corresponding to the M*N pieces of first data, and the network device may not indicate the index of each RV, thereby saving transmission resources.

With reference to the thirteenth aspect, in a possible implementation, the method further includes: sending, by the network device, second indication information to the terminal, where the second indication information is used to indicate an index of an RV corresponding to each piece of first data sent in each of the M time units. In this possible implementation, the terminal may directly determine, based on the second indication information, the index of the RV corresponding to each first data, and the terminal does not perform an additional operation, so that implementation complexity of the terminal can be reduced.

According to the fourteenth aspect, a data transmission method is provided. The data transmission method includes: sending, by a network device, second indication information to a terminal, where the second indication information is used to indicate an index of one of M*N RVs; the M*N RVs are in a one-to-one correspondence with M*N pieces of first data; and the M*N pieces of first data are all first data sent by the network device in M time units; and sending, by the network device, N pieces of first data in each of the M time units by using N beams, where all the first data sent by the network device in the M time units is generated based on a same piece of second data, and an index of the first RV in the M*N RVs to an index of an M*N$^{th}$ RV in the M*N RVs satisfy a preset cyclic order.

According to the method provided in the fourteenth aspect, the network device may send, in each of the M time units by using a plurality of beams, N pieces of first data generated by using a same piece of second data. Compared with sending a plurality of different RVs of a same TB in a plurality of consecutive time units, this can reduce a data transmission delay and improve data transmission efficiency while ensuring data transmission reliability. In addition, the terminal may learn, based on the second indication information and the preset cyclic order that the indexes of the M*N RVs satisfy, of the indexes of the RVs corresponding to the M*N pieces of first data, and the network device may not indicate the index of each RV, thereby saving transmission resources.

With reference to the fourteenth aspect, in a possible implementation, before the sending, by a network device, second indication information to a terminal, the method further includes: generating, by the network device, the second indication information.

With reference to the fourteenth aspect, in a possible implementation, the second data is a TB, and the N pieces of first data sent by the network device in each of the M time units correspond to a plurality of different RVs of the same piece of second data; or the second data is a TB, the N pieces of first data sent by the network device in each of the M time units correspond to a same RV of the same piece of second data, and first data sent by the network device in different time units in the M time units corresponds to a plurality of different RVs of the same piece of second data. In this possible implementation, the terminal may combine and decode the first data corresponding to the different RVs of the same piece of second data, thereby improving a decoding success rate.

According to the fifteenth aspect, a data transmission method is provided. The data transmission method includes: sending, by a network device, second indication information to a terminal, where the second indication information is used to indicate an index of one of M RVs, and an index of the first RV in the M RVs to an index of an M$^{th}$ RV in the M RVs satisfy a preset cyclic order; and sending, by the network device, N pieces of first data in each of M time units by using N beams, where all the first data sent by the network device in the M time units is generated based on a same piece of second data; an m$^{th}$ RV in the M RVs is an RV corresponding to N pieces of first data sent by the network device in an m$^{th}$ time unit in the M time units; an index of an RV corresponding to the N pieces of first data sent by the network device in each of the M time units is the same; and m is an integer greater than 0 and less than or equal to M.

According to the method provided in the fifteenth aspect, the network device may send, in each of a plurality of time units by using a plurality of beams, a plurality of pieces of first data generated by using a same piece of second data. Compared with sending a plurality of different RVs of a same TB in a plurality of consecutive time units, this can reduce a data transmission delay and improve data transmission efficiency while ensuring data transmission reliability. In addition, the terminal may learn, based on the second indication information and the preset cyclic order that the indexes of the M RVs satisfy, of the index of the RV corresponding to each piece of first data, and the network device may not indicate the index of each RV, thereby saving transmission resources.

With reference to the fifteenth aspect, in a possible implementation, before the sending, by a network device, second indication information to a terminal, the method further includes: generating, by the network device, the second indication information.

With reference to the fifteenth aspect, in a possible implementation, the second data is a TB, and the N pieces of first data sent by the network device in each of the M time units correspond to a plurality of different RVs of the same piece of second data; or the second data is a TB, the N pieces of first data sent by the network device in each of the M time units correspond to a same RV of the same piece of second data, and first data sent by the network device in different time units in the M time units corresponds to a plurality of different RVs of the same piece of second data. In this possible implementation, the terminal may combine and decode the first data corresponding to the different RVs of the same piece of second data, thereby improving a decoding success rate.

According to the sixteenth aspect, a data transmission method is provided. The data transmission method includes: sending, by a network device, second indication information to a terminal, where the second indication information is used to indicate an index of an RV corresponding to each piece of first data sent by the network device in each of M time units; and sending, by the network device, a plurality of pieces of first data in at least one of the M time units by using a plurality of beams, where all the first data sent in the M time units is generated based on a same piece of second data, and M is an integer greater than 1.

According to the method provided in the sixteenth aspect, the network device may send, in at least one time unit by using a plurality of beams, a plurality of pieces of first data generated by using a same piece of second data. Compared with sending a plurality of different RVs of a same TB in a plurality of consecutive time units, this can reduce a data transmission delay and improve data transmission efficiency while ensuring data transmission reliability. In addition, the terminal may directly determine, based on the second indication information, the indexes of the RVs corresponding to the N pieces of first data, and the terminal does not perform an additional operation, so that implementation complexity of the terminal can be reduced.

With reference to the sixteenth aspect, in a possible implementation, the network device sends N pieces of first data in each of the M time units by using N beams, the second indication information is carried in DCI, the DCI includes indexes of M*N RVs of a same TB, the same TB is the same piece of second data, and N is an integer greater than 1.

With reference to the sixteenth aspect, in a possible implementation, before the sending, by a network device, second indication information to a terminal, the method further includes: generating, by the network device, the second indication information.

With reference to the sixteenth aspect, in a possible implementation, the second data is a TB, and the N pieces of first data sent by the network device in each of the M time units correspond to a plurality of different RVs of the same piece of second data; or the second data is a TB, the N pieces of first data sent by the network device in each of the M time units correspond to a same RV of the same piece of second data, and first data sent by the network device in different time units in the M time units corresponds to a plurality of different RVs of the same piece of second data. In this possible implementation, the terminal may combine and decode the first data corresponding to the different RVs of the same piece of second data, thereby improving a decoding success rate.

With reference to any method provided in any one of the thirteenth aspect to the sixteenth aspect, in a possible implementation, the method further includes: sending, by the network device, third indication information to the terminal, where the third indication information is used to indicate a quantity of DMRS ports used by the network device to send the first data in each of the M time units; or the third indication information is used to indicate a quantity of TRPs used by the network device to send the first data in each of the M time units, and the network device sends one piece of first data by using one TRP; or the third indication information is used to indicate a quantity of TCIs used by the network device to send the first data in each of the M time units; or the third indication information is used to indicate a quantity of the first data sent by the network device in each of the M time units; or the third indication information is used to indicate a quantity of different RVs corresponding to the first data sent by the network device in each of the M time units.

The third indication information and the first indication information may be same indication information, or may be different indication information.

According to the seventeenth aspect, a data transmission method is provided. The data transmission method includes: receiving, by a terminal, first indication information from a network device, where the first indication information is used to indicate the network device to perform data transmission by using a space-time repeat transmission scheme, and the space-time repeat transmission scheme is a transmission scheme in which first data is sent in M time units by using a plurality of beams; sending, by the network device, a plurality of pieces of first data in at least one of the M time units by using a plurality of beams, where all the first data sent in the M time units is generated based on a same piece of second data, and M is an integer greater than 1; receiving, by the terminal, a plurality of pieces of first data from the network device in the M time units based on the first indication information; and combining and decoding, by the terminal, all the first data received in the M time units.

When the network device sends N pieces of first data in each of the M time units by using N beams, the terminal receives the N pieces of first data from the network device in each of the M time units based on the first indication information.

According to the method provided in the seventeenth aspect, the network device may send, in at least one time unit by using a plurality of beams, a plurality of pieces of first data generated by using a same piece of second data, and the terminal may combine and decode the plurality of pieces of first data generated by using the same piece of second data, thereby improving a decoding success rate.

With reference to the seventeenth aspect, in a possible implementation, the network device sends N pieces of first data in each of the M time units by using N beams, the second data is a TB, and the N pieces of first data sent by the network device in each of the M time units correspond to a plurality of different RVs of the same piece of second data; or the second data is a TB, the N pieces of first data sent by the network device in each of the M time units correspond to a same RV of the same piece of second data, and first data sent by the network device in different time units in the M time units corresponds to a plurality of different RVs of the same piece of second data, and N is an integer greater than 1. In this possible implementation, the terminal may combine and decode the first data corresponding to the different RVs of the same piece of second data, thereby improving a decoding success rate.

With reference to the seventeenth aspect, in a possible implementation, the network device sends N pieces of first data in each of the M time units by using N beams, and the method further includes: receiving, by the terminal, second indication information from the network device, where the second indication information is used to indicate an index of one of M*N RVs; the M*N RVs are in a one-to-one correspondence with M*N pieces of first data; the M*N pieces of first data are all the first data sent by the network device in the M time units; and an index of the first RV in the M*N RVs to an index of an M*N$^{th}$ RV in the M*N RVs satisfy a preset cyclic order; and the combining and decoding, by the terminal, all the first data received in the M time units includes: combining, by the terminal based on the second indication information, all the first data received in the M time units, and decoding all the combined first data. In this possible implementation, the terminal may learn, based on the second indication information and the preset cyclic order that the indexes of the M*N RVs satisfy, of the indexes of the RVs corresponding to the M*N pieces of first data, and the network device may not indicate the index of each RV, thereby saving transmission resources.

With reference to the seventeenth aspect, in a possible implementation, the combining, by the terminal based on the second indication information, all the first data received in the M time units includes: determining, by the terminal based on the second indication information and the preset cyclic order that the indexes of the M*N RVs satisfy, the index of the RV corresponding to each piece of first data in all the first data; and combining, by the terminal, all the first data based on the index of the RV corresponding to each piece of first data in all the first data. In this possible implementation, the terminal may learn, based on the second indication information and the preset cyclic order that the indexes of the M*N RVs satisfy, of the indexes of the RVs corresponding to the M*N pieces of first data, and the network device may not indicate the index of each RV, thereby saving transmission resources.

With reference to the seventeenth aspect, in a possible implementation, the method further includes: receiving, by the terminal, second indication information from the network device, where the second indication information is used to indicate an index of one of M RVs; an index of the first RV in the M RVs to an index of an M$^{th}$ RV in the M RVs satisfy a preset cyclic order; an m$^{th}$ RV in the M RVs is an RV corresponding to N pieces of first data sent by the network device in an m$^{th}$ time unit in the M time units; an index of an RV corresponding to the N pieces of first data sent by the network device in each of the M time units is the same; and m is an integer greater than 0 and less than or equal to M; and the combining and decoding, by the terminal, all the first data received in the M time units includes: combining, by the terminal based on the second indication information, all the first data received in the M time units, and decoding all the combined first data. In this possible implementation, the terminal may learn, based on the second indication information and the preset cyclic order that the indexes of the M RVs satisfy, of the index of the RV corresponding to each piece of first data, and the network device may not indicate the index of each RV, thereby saving transmission resources.

With reference to the seventeenth aspect, in a possible implementation, the combining, by the terminal based on the second indication information, all the first data received in the M time units includes: determining, by the terminal based on the second indication information and the preset cyclic order that the indexes of the M RVs satisfy, the index of the RV corresponding to each piece of first data in all the first data; and combining, by the terminal, all the first data based on the index of the RV corresponding to each piece of first data in all the first data. In this possible implementation, the terminal may learn, based on the second indication information and the preset cyclic order that the indexes of the M RVs satisfy, of the index of the RV corresponding to each piece of first data, and the network device may not indicate the index of each RV, thereby saving transmission resources.

With reference to the seventeenth aspect, in a possible implementation, the method further includes: receiving, by the terminal, second indication information from the network device, where the second indication information is used to indicate an index of an RV corresponding to each piece of first data sent in each of the M time units; and the combining and decoding, by the terminal, all the first data received in the M time units includes: combining, by the terminal based on the second indication information, all the first data received in the M time units, and decoding all the combined first data. In this possible implementation, the terminal may directly determine, based on the second indication information, the indexes of the RVs corresponding to the N pieces of first data, and the terminal does not perform an additional operation, so that implementation complexity of the terminal can be reduced.

With reference to the seventeenth aspect, in a possible implementation, the method further includes: receiving, by the terminal, third indication information from the network device, where the third indication information is used to indicate a quantity of DMRS ports used by the network device to send the first data in each of the M time units; or the third indication information is used to indicate a quantity of TRPs used by the network device to send the first data in each of the M time units, and the network device sends one piece of first data by using one TRP; or the third indication information is used to indicate a quantity of TCIs used by the network device to send the first data in each of the M time units; or the third indication information is used to indicate a quantity of the first data sent by the network device in each of the M time units, or the third indication information is used to indicate a quantity of different RVs corresponding to the first data sent by the network device in each of the M time units; and the receiving, by the terminal, the plurality of pieces of first data from the network device in the M time units based on the first indication information includes: receiving, by the terminal, the plurality of pieces of first data from the network device in the M time units based on the first indication information and the third indication information.

When the network device sends N pieces of first data in each of the M time units by using N beams, the terminal receives the N pieces of first data from the network device in each of the M time units based on the first indication information and the third indication information.

The third indication information and the first indication information may be same indication information, or may be different indication information.

According to the eighteenth aspect, a data transmission method is provided. The data transmission method includes: receiving, by a terminal, second indication information from a network device, where the second indication information is used to indicate an index of one of M*N RVs; the M*N RVs are in a one-to-one correspondence with M*N pieces of first data; and the M*N pieces of first data are all first data sent by the network device in M time units; sending, by the network device. N pieces of first data in each of the M time units by using N beams, where all the first data sent by the network device in the M time units is generated based on a same piece of second data, and an index of the first RV in the M*N RVs to an index of an M*N$^{th}$ RV in the M*N RVs satisfy a preset cyclic order; and combining, by the terminal based on the second indication information, all the first data received in the M time units, and decoding all the combined first data.

According to the method provided in the eighteenth aspect, the network device may send, in each of the M time units. N pieces of first data generated by using a same piece of second data, and the terminal may combine and decode the plurality of pieces of first data generated by using the same piece of second data, thereby improving a decoding success rate. In addition, the terminal may learn, based on the second indication information and the preset cyclic order that the indexes of the M*N RVs satisfy, of the indexes of the RVs corresponding to the M*N pieces of first data, and the network device may not indicate the index of each RV, thereby saving transmission resources.

With reference to the eighteenth aspect, in a possible implementation, the combining, by the terminal based on the second indication information, all the first data received in the M time units includes: determining, by the terminal based on the second indication information and the preset cyclic order that the indexes of the M*N RVs satisfy, the index of the RV corresponding to each piece of first data in all the first data; and combining, by the terminal, all the first data based on the index of the RV corresponding to each piece of first data in all the first data. In this possible implementation, the terminal may learn, based on the second indication information and the preset cyclic order that the indexes of the M*N RVs satisfy, of the indexes of the RVs corresponding to the M*N pieces of first data, and the network device may not indicate the index of each RV, thereby saving transmission resources.

With reference to the eighteenth aspect, in a possible implementation, the second data is a TB, and the N pieces of first data sent by the network device in each of the M time units correspond to a plurality of different RVs of the same piece of second data; or the second data is a TB, the N pieces of first data sent by the network device in each of the M time units correspond to a same RV of the same piece of second data, and first data sent by the network device in different time units in the M time units corresponds to a plurality of different RVs of the same piece of second data. In this possible implementation, the terminal may combine and decode the first data corresponding to the different RVs of the same piece of second data, thereby improving a decoding success rate.

According to the nineteenth aspect, a data transmission method is provided. The data transmission method includes: receiving, by a terminal, second indication information from a network device, where the second indication information is used to indicate an index of one of M RVs, and an index of the first RV in the M RVs to an index of an M$^{th}$ RV in the M RVs satisfy a preset cyclic order; sending, by the network device, N pieces of first data in each of M time units by using N beams, where all the first data sent by the network device in the M time units is generated based on a same piece of second data, an m$^{th}$ RV in the M RVs is an RV corresponding to N pieces of first data sent by the network device in an m$^{th}$ time unit in the M time units; an index of an RV corresponding to the N pieces of first data sent by the network device in each of the M time units is the same; and m is an integer greater than 0 and less than or equal to M; and combining, by the terminal based on the second indication information, all the first data received in the M time units, and decoding all the combined first data.

According to the method provided in the nineteenth aspect, the network device may send, in each of the M time units by using a plurality of beams, a plurality of pieces of first data generated by using a same piece of second data, and the terminal may combine and decode the plurality of pieces of first data generated by using the same piece of second data, thereby improving a decoding success rate. In addition, the terminal may learn, based on the second indication information and the preset cyclic order that the indexes of the M RVs satisfy, of the index of the RV corresponding to each piece of first data, and the network device may not indicate the index of each RV, thereby saving transmission resources.

With reference to the nineteenth aspect, in a possible implementation, the combining, by the terminal based on the second indication information, all the first data received in the M time units includes: determining, by the terminal based on the second indication information and the preset cyclic order that the indexes of the M RVs satisfy, the index of the RV corresponding to each piece of first data in all the first data; and combining, by the terminal, all the first data based on the index of the RV corresponding to each piece of first data in all the first data. In this possible implementation, the terminal may learn, based on the second indication information and the preset cyclic order that the indexes of the M RVs satisfy, of the index of the RV corresponding to each piece of first data, and the network device may not indicate the index of each RV, thereby saving transmission resources.

With reference to the nineteenth aspect, in a possible implementation, the second data is a TB, and the N pieces of first data sent by the network device in each of the M time units correspond to a plurality of different RVs of the same piece of second data; or the second data is a TB, the N pieces of first data sent by the network device in each of the M time units correspond to a same RV of the same piece of second data, and first data sent by the network device in different time units in the M time units corresponds to a plurality of different RVs of the same piece of second data. In this possible implementation, the terminal may combine and decode the first data corresponding to the different RVs of the same piece of second data, thereby improving a decoding success rate.

According to the twentieth aspect, a data transmission method is provided. The data transmission method includes: receiving, by a terminal, second indication information from a network device, where the second indication information is used to indicate an index of an RV corresponding to each piece of first data sent by the network device in each of M time units; sending, by the network device, a plurality of pieces of first data in at least one of the M time units by using a plurality of beams, where all the first data sent in the M time units is generated based on a same piece of second data, and M is an integer greater than 1; and combining, by the terminal based on the second indication information, all the first data received in the M time units, and decoding all the combined first data.

According to the method provided in the twentieth aspect, the network device may send, in at least one time unit by using a plurality of beams, a plurality of pieces of first data generated by using a same piece of second data, and the terminal may combine and decode the plurality of pieces of first data generated by using the same piece of second data, thereby improving a decoding success rate. In addition, the terminal may directly determine, based on the second indication information, the indexes of the RVs corresponding to the N pieces of first data, and the terminal does not perform an additional operation, so that implementation complexity of the terminal can be reduced.

With reference to the twentieth aspect, in a possible implementation, the network device sends N pieces of first data in each of the M time units by using N beams, the second indication information is carried in DCI, the DCI includes indexes of M*N RVs of a same TB, and the same TB is the same piece of second data.

With reference to the twentieth aspect, in a possible implementation, the second data is a TB, and the N pieces of first data sent by the network device in each of the M time units correspond to a plurality of different RVs of the same piece of second data; or the second data is a TB, the N pieces of first data sent by the network device in each of the M time units correspond to a same RV of the same piece of second data, and first data sent by the network device in different time units in the M time units corresponds to a plurality of different RVs of the same piece of second data. In this possible implementation, the terminal may combine and decode the first data corresponding to the different RVs of the same piece of second data, thereby improving a decoding success rate.

With reference to the method provided in the eighteenth aspect, the nineteenth aspect, or the twentieth aspect, in a possible implementation, the method further includes: receiving, by the terminal, third indication information from the network device, where the third indication information is used to indicate a quantity of DMRS ports used by the network device to send the first data in each of the M time units; or the third indication information is used to indicate a quantity of TRPs used by the network device to send the first data in each of the M time units, and the network device sends one piece of first data by using one TRP; or the third indication information is used to indicate a quantity of TCIs used by the network device to send the first data in each of the M time units; or the third indication information is used to indicate a quantity of the first data sent by the network device in each of the M time units; or the third indication information is used to indicate a quantity of different RVs corresponding to the first data sent by the network device in each of the M time units; and receiving, by the terminal, the N pieces of first data from the network device in each of the M time units based on the third indication information.

According to the twenty-first aspect, a data transmission apparatus is provided. The data transmission apparatus includes a communications unit and a processing unit. The processing unit is configured to send first indication information to a terminal through the communications unit, where the first indication information is used to indicate the data transmission apparatus to perform data transmission by using a space-time repeat transmission scheme, and the space-time repeat transmission scheme is a transmission scheme in which first data is sent in M time units by using a plurality of beams. The communications unit is configured to send a plurality of pieces of first data in at least one of the M time units by using a plurality of beams, where all the first data sent in the M time units is generated based on a same piece of second data, and M is an integer greater than 1. The processing unit is further configured to send a plurality of pieces of first data to the terminal in the M time units through the communications unit by using a plurality of beams.

Quantities of first data sent by the data transmission apparatus in different time units may be the same, or may be different. In one time unit, the data transmission apparatus may send a plurality of pieces of first data by using one beam, or may send one piece of first data by using one beam, or may send one piece of first data by using a plurality of beams. It should be noted that a DMRS port, a TCI, a TRP, an SRI, a resource index of a CSI-RS, an index of an SS/PBCH block, a resource index of an SRS, and a resource index of a TRS each may represent a beam. Therefore, the beam herein may also be replaced with a DMRS port, a TCI, a TRP, an SRI, a resource index of a CSI-RS, an index of an SS/PBCH block, a resource index of an SRS, a resource index of a TRS, or the like. The descriptions in this paragraph are also applicable to any one of the following twenty-second aspect to twenty-fourth aspect, and details are not described again in the twenty-second aspect to the twenty-fourth aspect.

For example, a plurality of beams for sending the first data in one time unit may be N DMRS ports or N TCIs. In this case, the data transmission apparatus sends the N pieces of first data in each time unit by using the N DMRS ports or the N TCIs, and the data transmission apparatus sends one piece of first data by using one DMRS port or one TCI. The descriptions in this paragraph are also applicable to any one of the following twenty-second aspect to twenty-fourth aspect, and details are not described again in the twenty-second aspect to the twenty-fourth aspect.

With reference to the twenty-first aspect, in a possible implementation, the second data is a TB, and the N pieces of first data sent by the data transmission apparatus in each of the M time units correspond to a plurality of different RVs of the same piece of second data; or the second data is a TB, the N pieces of first data sent by the data transmission apparatus in each of the M time units corresponds to a same RV of the same piece of second data, and first data sent by the data transmission apparatus in different time units in the M time units corresponds to a plurality of different RVs of the same piece of second data.

With reference to the twenty-first aspect, in a possible implementation, the processing unit is further configured to send second indication information to the terminal through the communications unit, where the second indication information is used to indicate an index of one of M*N RVs; the M*N RVs are in a one-to-one correspondence with M*N pieces of first data; the M*N pieces of first data are all the first data sent by the data transmission apparatus in the M time units; and an index of the first RV in the M*N RVs to an index of an M*N$^{th}$ RV in the M*N RVs satisfy a preset cyclic order; or the processing unit is further configured to send second indication information to the terminal through the communications unit, where the second indication information is used to indicate an index of one of M RVs; an index of the first RV in the M RVs to an index of an M$^{th}$ RV in the M RVs satisfy a preset cyclic order; an m$^{th}$ RV in the M RVs is an RV corresponding to N pieces of first data sent by the data transmission apparatus in an m$^{th}$ time unit in the M time units; an index of an RV corresponding to the N pieces of first data sent by the data transmission apparatus in each of the M time units is the same; and m is an integer greater than 0 and less than or equal to M.

With reference to the twenty-first aspect, in a possible implementation, the processing unit is further configured to send second indication information to the terminal through the communications unit, where the second indication information is used to indicate an index of an RV corresponding to each piece of first data sent in each of the M time units.

According to the twenty-second aspect, a data transmission apparatus is provided. The data transmission apparatus includes a communications unit and a processing unit. The processing unit is configured to send second indication information to a terminal through the communications unit, where the second indication information is used to indicate an index of one of M*N RVs; the M*N RVs are in a one-to-one correspondence with M*N pieces of first data; and the M*N pieces of first data are all first data sent by the data transmission apparatus in M time units. The communications unit is configured to send N pieces of first data in each of the M time units by using N beams, where an index of the first RV in the M*N RVs to an index of an M*N$^{th}$ RV in the M*N RVs satisfy a preset cyclic order; and all the first data sent by the data transmission apparatus in the M time units is generated based on a same piece of second data.

With reference to the twenty-second aspect, in a possible implementation, the processing unit is further configured to generate the second indication information.

With reference to the twenty-second aspect, in a possible implementation, the second data is a TB, and the N pieces of first data sent by the data transmission apparatus in each of the M time units correspond to a plurality of different RVs of the same piece of second data; or the second data is a TB, the N pieces of first data sent by the data transmission apparatus in each of the M time units corresponds to a same RV of the same piece of second data, and first data sent by the data transmission apparatus in different time units in the M time units corresponds to a plurality of different RVs of the same piece of second data.

According to the twenty-third aspect, a data transmission apparatus is provided. The data transmission apparatus includes a communications unit and a processing unit. The processing unit is configured to send second indication information to a terminal through the communications unit, where the second indication information is used to indicate an index of one of M RVs, and an index of the first RV in the M RVs to an index of an M$^{th}$ RV in the M RVs satisfy a preset cyclic order. The communications unit is configured to send N pieces of first data in each of the M time units by using N beams, where all the first data sent by the data transmission apparatus in the M time units is generated based on a same piece of second data; an m$^{th}$ RV in the M RVs is an RV corresponding to N pieces of first data sent by the data transmission apparatus in an m$^{th}$ time unit in the M time units; an index of an RV corresponding to the N pieces of first data sent by the data transmission apparatus in each of the M time units is the same; and m is an integer greater than 0 and less than or equal to M.

With reference to the twenty-third aspect, in a possible implementation, the processing unit is further configured to generate the second indication information.

With reference to the twenty-third aspect, in a possible implementation, the second data is a TB, and the N pieces of first data sent by the data transmission apparatus in each of the M time units correspond to a plurality of different RVs of the same piece of second data; or the second data is a TB, the N pieces of first data sent by the data transmission apparatus in each of the M time units corresponds to a same RV of the same piece of second data, and first data sent by the data transmission apparatus in different time units in the M time units corresponds to a plurality of different RVs of the same piece of second data.

According to the twenty-fourth aspect, a data transmission apparatus is provided. The data transmission apparatus includes a communications unit and a processing unit. The processing unit is configured to send second indication information to a terminal through the communications unit, where the second indication information is used to indicate an index of an RV corresponding to each piece of first data sent by the data transmission apparatus in each of M time units. The communications unit is configured to send a plurality of pieces of first data in at least one of the M time units by using a plurality of beams, where all the first data sent in the M time units is generated based on a same piece of second data, and M is an integer greater than 1.

With reference to the twenty-fourth aspect, in a possible implementation, the data transmission apparatus sends N pieces of first data in each of the M time units by using N beams, the second indication information is carried in DCI, the DCI includes indexes of M*N RVs of a same TB, the same TB is the same piece of second data, and N is an integer greater than 1.

With reference to the twenty-fourth aspect, in a possible implementation, the processing unit is further configured to generate the second indication information.

With reference to the twenty-fourth aspect, in a possible implementation, the second data is a TB, and the N pieces of first data sent by the data transmission apparatus in each of the M time units correspond to a plurality of different RVs of the same piece of second data; or the second data is a TB, the N pieces of first data sent by the data transmission apparatus in each of the M time units corresponds to a same RV of the same piece of second data, and first data sent by the data transmission apparatus in different time units in the M time units corresponds to a plurality of different RVs of the same piece of second data.

With reference to any apparatus provided in any one of the twenty-first aspect to the twenty-fourth aspect, in a possible implementation, the communications unit is further configured to send third indication information to the terminal, where the third indication information is used to indicate a quantity of DMRS ports used by the data transmission apparatus to send the first data in each of the M time units, or the third indication information is used to indicate a quantity of TRPs used by the data transmission apparatus to send the first data in each of the M time units, and the data transmission apparatus sends one piece of first data by using one TRP; or the third indication information is used to indicate a quantity of TCIs used by the data transmission apparatus to send the first data in each of the M time units; or the third indication information is used to indicate a quantity of the first data sent by the data transmission apparatus in each of the M time units; or the third indication information is used to indicate a quantity of different RVs corresponding to the first data sent by the data transmission apparatus in each of the M time units.

The third indication information and the first indication information may be same indication information, or may be different indication information.

According to the twenty-fifth aspect, a data transmission apparatus is provided. The data transmission apparatus includes a communications unit and a processing unit.

The communications unit is configured to receive first indication information from a network device, where the first indication information is used to indicate the network device to perform data transmission by using a space-time repeat transmission scheme, and the space-time repeat transmission scheme is a transmission scheme in which first data is sent in M time units by using a plurality of beams. The network device sends a plurality of pieces of first data in at least one of the M time units by using a plurality of beams, where all the first data sent in the M time units is generated based on a same piece of second data, and M is an integer greater than 1. The processing unit is configured to receive, through the communications unit, a plurality of pieces of first data from the network device in the M time units based on the first indication information. The processing unit is further configured to combine and decode all the first data received in the M time units.

Quantities of first data sent by the network device in different time units may be the same, or may be different. In one time unit, the network device may send a plurality of pieces of first data by using one beam, or may send one piece of first data by using one beam, or may send one piece of first data by using a plurality of beams. It should be noted that a DMRS port, a TCI, a TRP, an SRI, a resource index of a CSI-RS, an index of an SS/PBCH block, a resource index of an SRS, and a resource index of a TRS each may represent a beam. Therefore, the beam herein may also be replaced with a DMRS port, a TCI, a TRP, an SRI, a resource index of a CSI-RS, an index of an SS/PBCH block, a resource index of an SRS, a resource index of a TRS, or the like. The descriptions in this paragraph are also applicable to any one of the following twenty-sixth aspect to twenty-eighth aspect, and details are not described again in the twenty-sixth aspect to the twenty-eighth aspect.

For example, a plurality of beams for sending the first data in one time unit may be N DMRS ports or N TCIs. In this case, the network device sends N pieces of first data in each time unit by using the N DMRS ports or the N TCIs, and the network device sends one piece of first data by using one DMRS port or one TCI. The descriptions in this paragraph are also applicable to any one of the following twenty-sixth aspect to twenty-eighth aspect, and details are not described again in the twenty-sixth aspect to the twenty-eighth aspect.

When the network device sends N pieces of first data in each of the M time units by using N beams, the data transmission apparatus receives the N pieces of first data from the network device in each of the M time units based on the first indication information.

With reference to the twenty-fifth aspect, in a possible implementation, the network device sends N pieces of first data in each of the M time units by using N beams, the second data is a TB, and the N pieces of first data sent by the network device in each of the M time units correspond to a plurality of different RVs of the same piece of second data; or the second data is a TB, the N pieces of first data sent by the network device in each of the M time units correspond to a same RV of the same piece of second data, and first data sent by the network device in different time units in the M time units corresponds to a plurality of different RVs of the same piece of second data, and N is an integer greater than 1.

With reference to the twenty-fifth aspect, in a possible implementation, the network device sends N pieces of first data in each of the M time units by using N beams; the communications unit is further configured to receive second indication information from the network device, where the second indication information is used to indicate an index of one of M*N RVs; the M*N RVs are in a one-to-one correspondence with M*N pieces of first data; the M*N pieces of first data are all the first data sent by the network device in the M time units; and an index of the first RV in the M*N RVs to an index of an M*N$^{th}$ RV in the M*N RVs satisfy a preset cyclic order; and the processing unit is specifically configured to combine, based on the second indication information, all the first data received in the M time units, and decode all the combined first data.

With reference to the twenty-fifth aspect, in a possible implementation, the processing unit is specifically configured to: determine, based on the second indication information and the preset cyclic order that the indexes of the M*N RVs satisfy, the index of the RV corresponding to each piece of first data in all the first data; and combine all the first data based on the index of the RV corresponding to each piece of first data in all the first data.

With reference to the twenty-fifth aspect, in a possible implementation, the communications unit is further configured to receive second indication information from the network device, where the second indication information is used to indicate an index of one of M RVs; an index of the first RV in the M RVs to an index of an M$^{th}$ RV in the M RVs satisfy a preset cyclic order; an m$^{th}$ RV in the M RVs is an RV corresponding to N pieces of first data sent by the network device in an m$^{th}$ time unit in the M time units; an index of an RV corresponding to the N pieces of first data sent by the network device in each of the M time units is the same; and m is an integer greater than 0 and less than or equal to M; and the processing unit is specifically configured to combine, based on the second indication information, all the first data received in the M time units, and decode all the combined first data.

With reference to the twenty-fifth aspect, in a possible implementation, the processing unit is specifically configured to: determine, based on the second indication information and the preset cyclic order that the indexes of the M RVs satisfy, the index of the RV corresponding to each piece of first data in all the first data; and combine all the first data based on the index of the RV corresponding to each piece of first data in all the first data.

With reference to the twenty-fifth aspect, in a possible implementation, the communications unit is further configured to receive second indication information from the network device, where the second indication information is used to indicate an index of an RV corresponding to each piece of first data sent in each of the M time units; and the processing unit is specifically configured to combine, based on the second indication information, all the first data received in the M time units, and decode all the combined first data.

With reference to the twenty-fifth aspect, in a possible implementation, the communications unit is further configured to receive third indication information from the network device, where the third indication information is used to indicate a quantity of DMRS ports used by the network device to send the first data in each of the M time units; or the third indication information is used to indicate a quantity of TRPs used by the network device to send the first data in each of the M time units, and the network device sends one piece of first data by using one TRP; or the third indication information is used to indicate a quantity of TCIs used by the network device to send the first data in each of the M time units; or the third indication information is used to indicate a quantity of the first data sent by the network device in each of the M time units; or the third indication information is used to indicate a quantity of different RVs corresponding to the first data sent by the network device in each of the M time units; and the processing unit is specifically configured to receive the plurality of pieces of first data from the network device in the M time units through the communications unit based on the first indication information and the third indication information.

When the network device sends N pieces of first data in each of the M time units by using N beams, the data transmission apparatus receives the N pieces of first data from the network device in each of the M time units based on the first indication information and the third indication information.

The third indication information and the first indication information may be same indication information, or may be different indication information.

According to the twenty-sixth aspect, a data transmission apparatus is provided. The data transmission apparatus includes a communications unit and a processing unit. The communications unit is configured to receive second indication information from a network device, where the second indication information is used to indicate an index of one of M*N RVs; the M*N RVs are in a one-to-one correspondence with M*N pieces of first data; and the M*N pieces of first data are all first data sent by the network device in M time units. The network device sends N pieces of first data in each of the M time units by using N beams, where all the first data sent by the network device in the M time units is generated based on a same piece of second data, and an index of the first RV in the M*N RVs to an index of an $M*N^{th}$ RV in the M*N RVs satisfy a preset cyclic order. The processing unit is configured to combine, based on the second indication information, all the first data received in the M time units, and decode all the combined first data.

With reference to the twenty-sixth aspect, in a possible implementation, the processing unit is specifically configured to: determine, based on the second indication information and the preset cyclic order that the indexes of the M*N RVs satisfy, the index of the RV corresponding to each piece of first data in all the first data; and combine all the first data based on the index of the RV corresponding to each piece of first data in all the first data.

With reference to the twenty-sixth aspect, in a possible implementation, the second data is a TB, and the N pieces of first data sent by the network device in each of the M time units correspond to a plurality of different RVs of the same piece of second data; or the second data is a TB, the N pieces of first data sent by the network device in each of the M time units correspond to a same RV of the same piece of second data, and first data sent by the network device in different time units in the M time units corresponds to a plurality of different RVs of the same piece of second data.

According to the twenty-seventh aspect, a data transmission apparatus is provided. The data transmission apparatus includes a communications unit and a processing unit. The communications unit is configured to receive second indication information from a network device, where the second indication information is used to indicate an index of one of M RVs, and an index of the first RV in the M RVs to an index of an $M^{th}$ RV in the M RVs satisfy a preset cyclic order. The network device sends N pieces of first data in each of M time units by using N beams, where all the first data sent by the network device in the M time units is generated based on a same piece of second data; an $m^{th}$ RV in the M RVs is an RV corresponding to N pieces of first data sent by the network device in an $m^{th}$ time unit in the M time units; an index of an RV corresponding to the N pieces of first data sent by the network device in each of the M time units is the same; and m is an integer greater than 0 and less than or equal to M. The processing unit is configured to combine, based on the second indication information, all the first data received in the M time units, and decode all the combined first data.

With reference to the twenty-seventh aspect, in a possible implementation, the processing unit is specifically configured to: determine, based on the second indication information and the preset cyclic order that the indexes of the M RVs satisfy, the index of the RV corresponding to each piece of first data in all the first data; and combine all the first data based on the index of the RV corresponding to each piece of first data in all the first data.

With reference to the twenty-seventh aspect, in a possible implementation, the second data is a TB, and the N pieces of first data sent by the network device in each of the M time units correspond to a plurality of different RVs of the same piece of second data; or the second data is a TB, the N pieces of first data sent by the network device in each of the M time units correspond to a same RV of the same piece of second data, and first data sent by the network device in different time units in the M time units corresponds to a plurality of different RVs of the same piece of second data.

According to the twenty-eighth aspect, a data transmission apparatus is provided. The data transmission apparatus includes a communications unit and a processing unit. The communications unit is configured to receive second indication information from a network device, where the second indication information is used to indicate an index of an RV corresponding to each piece of first data sent by the network device in each of M time units. The network device sends a plurality of pieces of first data in at least one of the M time units by using a plurality of beams, where all the first data sent in the M time units is generated based on a same piece of second data, and M is an integer greater than 1. The processing unit is configured to combine, based on the second indication information, all the first data received in the M time units, and decode all the combined first data.

With reference to the twenty-eighth aspect, in a possible implementation, the network device sends N pieces of first data in each of the M time units by using N beams, the second indication information is carried in DCI, the DI includes indexes of M*N RVs of a same TB, and the same TB is the same piece of second data.

With reference to the twenty-eighth aspect, in a possible implementation, the second data is a TB, and the N pieces of first data sent by the network device in each of the M time units correspond to a plurality of different RVs of the same piece of second data; or the second data is a TB, the N pieces of first data sent by the network device in each of the M time units correspond to a same RV of the same piece of second data, and first data sent by the network device in different time units in the M time units corresponds to a plurality of different RVs of the same piece of second data.

With reference to the apparatus provided in the twenty-sixth aspect, the twenty-seventh aspect, or the twenty-eighth aspect, in a possible implementation, the communications unit is further configured to receive third indication information from the network device, where the third indication information is used to indicate a quantity of DMRS ports used by the network device to send the first data in each of the M time units; or the third indication information is used to indicate a quantity of TRPs used by the network device to send the first data in each of the M time units, and the network device sends one piece of first data by using one TRP; or the third indication information is used to indicate a quantity of TCIs used by the network device to send the first data in each of the M time units; or the third indication information is used to indicate a quantity of the first data sent by the network device in each of the M time units; or the third indication information is used to indicate a quantity of different RVs corresponding to the first data sent by the network device in each of the M time units; and the processing unit is further configured to receive the N pieces of first data from the network device in each of the M time units through the communications unit based on the third indication information.

For the descriptions of the fourteenth aspect to the sixteenth aspect and the eighteenth aspect to the twentieth aspect in the foregoing embodiments, refer to related descriptions in Description of embodiments. For beneficial effects of different implementations of the twenty-first aspect to the twenty-eighth aspect, refer to beneficial effects of corresponding implementations of the thirteenth aspect to the twentieth aspect.

In the foregoing embodiments, an example in which the provided method is applied to downlink data (that is, the network device sends the first data by using the space-time repeat transmission scheme) is used to describe the method provided in this application. During actual implementation, the foregoing method may also be applied to uplink data (that is, the terminal sends the first data by using the space-time repeat transmission scheme). In this case, the actions performed by the network device in the thirteenth aspect to the twentieth aspect may be performed by the terminal, and the actions performed by the terminal in the thirteenth aspect to the twentieth aspect may be performed by the network device. In addition, a repeat transmission scheme to be used by the terminal may be indicated by the network device, or may be determined by the terminal and then notified to the network device.

In addition to the methods and the apparatuses provided in the first part and the second part:

According to a twenty-ninth aspect, a data transmission apparatus is further provided. The data transmission apparatus includes a memory and a processor. Optionally, the data transmission apparatus further includes at least one communications interface and a communications bus. The memory is configured to store computer-executable instructions. The processor, the memory, and the at least one communications interface are connected through the communications bus. The processor executes the computer-executable instructions stored in the memory, to enable the data transmission apparatus to implement any method provided in any one of the first aspect to the third aspect and the thirteenth aspect to the sixteenth aspect. The apparatus may exist in a product form of a chip.

According to a thirtieth aspect, a data transmission apparatus is further provided. The data transmission apparatus includes a memory and a processor. Optionally, the data transmission apparatus further includes at least one communications interface and a communications bus. The memory is configured to store computer-executable instructions. The processor, the memory, and the at least one communications interface are connected through the communications bus. The processor executes the computer-executable instructions stored in the memory, to enable the data transmission apparatus to implement any method provided in any one of the fourth aspect to the sixth aspect and the seventeenth aspect to the twentieth aspect. The apparatus may exist in a product form of a chip.

According to a thirty-first aspect, a communications system is further provided. The communications system includes the data transmission apparatuses provided in the seventh aspect and the tenth aspect; or the data transmission apparatuses provided in the eighth aspect and the eleventh aspect; or the data transmission apparatuses provided in the ninth aspect and the twelfth aspect; or the data transmission apparatuses provided in the twenty-first aspect and the twenty-fifth aspect; or the data transmission apparatuses provided in the twenty-second aspect and the twenty-sixth aspect; or the data transmission apparatuses provided in the twenty-third aspect and the twenty-seventh aspect; or the data transmission apparatuses provided in the twenty-fourth aspect and the twenty-eighth aspect.

According to a thirty-second aspect, a computer-readable storage medium is further provided. The computer-readable storage medium includes instructions. When the instructions are run on a computer, the computer is enabled to perform any method provided in any one of the first aspect to the third aspect and the thirteenth aspect to the sixteenth aspect.

According to a thirty-third aspect, a computer-readable storage medium is further provided. The computer-readable storage medium includes instructions. When the instructions are run on a computer, the computer is enabled to perform any method provided in any one of the fourth aspect to the sixth aspect and the seventeenth aspect to the twentieth aspect.

According to a thirty-fourth aspect, a computer program product including instructions is further provided. When the computer program product runs on a computer, the computer is enabled to perform any method provided in any one of the first aspect to the third aspect and the thirteenth aspect to the sixteenth aspect.

According to a thirty-fifth aspect, a computer program product including instructions is further provided. When the computer program product runs on a computer, the computer is enabled to perform any method provided in any one of the fourth aspect to the sixth aspect and the seventeenth aspect to the twentieth aspect.

For technical effects achieved by any design manner of the twenty-ninth aspect to the thirty-fifth aspect, refer to technical effects achieved by a corresponding design manner of the first aspect to the sixth aspect and the thirteenth aspect to the twentieth aspect. Details are not described herein again.

It should be noted that various possible implementations of any one of the foregoing aspects may be combined provided that the solutions are not contradictory.

DESCRIPTION OF EMBODIMENTS

The following describes the technical solutions in the embodiments of this application with reference to the accompanying drawings in the embodiments of this application. In the descriptions of this application, unless otherwise specified, "/" means "or". For example, A/B may represent A or B. The term "and/or" in this specification describes only an association relationship for describing associated objects and represents that there may be three relationships. For example, A and/or B may represent the following three cases. Only A exists, both A and B exist, and only B exists. In addition, in the descriptions of this application, unless otherwise specified, "a plurality of" means two or more, and "at least one" means one or more.

In addition, for convenience of clear description of the technical solutions in the embodiments of this application, in the embodiments of this application, terms such as "first" and "second" are used to distinguish between same objects or similar objects whose functions and purposes are basically the same. A person skilled in the art may understand that the terms, such as "first" and "second", are not intended to limit a quantity or an execution sequence; and the terms, such as "first" and "second", do not indicate a definite difference.

The technical solutions in the embodiments of this application may be applied to various communications systems, such as an orthogonal frequency division multiple access (OFDMA) system, a single-carrier frequency division multiple access (SC-FDMA) system, and another system. The terms "system" and "network" can be interchanged with each other. The OFDMA system may implement wireless technologies such as evolved universal radio terrestrial access (E-UTRA) and ultra mobile broadband (UMB). E-UTRA is an evolved version of a universal mobile telecommunications system (UMTS). The 3rd generation partnership project (3GPP) uses a new version of E-UTRA in long term evolution (LTE) and various versions evolved based on LTE. A 5G communications system or a new radio (NR) communications system is a next-generation communications system that is being studied. In addition, the communications system may further be applicable to a future-oriented communications technology, and is applicable to the technical solutions provided in the embodiments of this application.

A method provided in the embodiments of this application may be applied to various service scenarios, for example, an enhanced mobile broadband (eMBB) service scenario, a URLLC service scenario, and an internet of things (IoT) service scenario.

Figure 1:
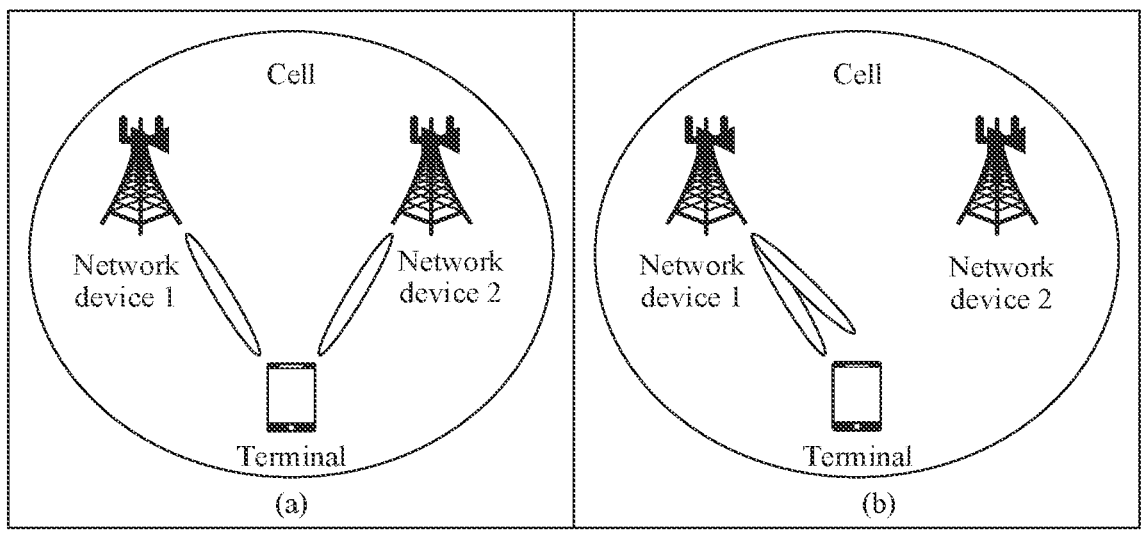
FIG. 1 is a schematic diagram of communication between a terminal and a network device.

The method provided in the embodiments of this application may be applied to a communications system including at least one network device and at least one terminal. In the communications system, one network device may transmit data and/or control signaling to one terminal, or a plurality of network devices may simultaneously transmit data and/or control signaling to one terminal. One network device or a plurality of network devices may transmit data and/or control signaling to one terminal by using a plurality of beams. For example, referring to FIG. 1, in a scenario (a) in FIG. 1, a plurality of network devices send data and/or control signaling to one terminal by using different beams; and in a scenario (b) in FIG. 1, one network device sends data and/or control signaling to one terminal by using different beams. In the embodiments of this application, unless otherwise specified, a plurality of beams may be a plurality of beams sent by one network device, or may be a plurality of beams sent by a plurality of network devices. For example, the plurality of network devices may be a plurality of radio remote units (RRU) of one base station, or may be a plurality of RRUs of a plurality of base stations.

The network device may be an apparatus that is deployed in a radio access network (RAN) and that provides a wireless communication function for the terminal, for example, may be a base station. The network device may be base stations in various forms, for example, a macro base station, a micro base station (also referred to as a small cell), a relay station, and an access point (AP), or may include control nodes in various forms, for example, a network controller. The control node may be connected to a plurality of base stations, and configure resources for a plurality of terminals covered by the plurality of base stations. In systems using different radio access technologies, a device having a base station function may have different names. For example, the device may be referred to as a base transceiver station (BTS) in a global system for mobile communications (GSM) or code division multiple access (CDMA) network, may be referred to as a NodeB (NodeB) in wideband code division multiple access (WCDMA), may be referred to as an evolved NodeB (eNB or eNodeB) in an LTE system, and may be referred to as a next-generation node base station (gNB) in a 5G communications system or an NR communications system. A specific name of the base station is not limited in this application. Alternatively, the network device may be a radio controller in a cloud radio access network (CRAN) scenario, a network device in a future evolved public land mobile network (PLMN), a transmission reception point (TRP), or the like.

Alternatively, the terminal may also be referred to as user equipment (UE), a terminal device, an access terminal, a subscriber unit, a subscriber station, a mobile station, a remote station, a remote terminal, a mobile device, a user terminal, a wireless communications device, a user agent, or a user apparatus. The terminal may be a mobile station (MS), a subscriber unit (subscriber unit), an unmanned aerial vehicle, an IoT device, a station (STA) in a wireless local area network (WLAN), a cellular phone (cellular phone), a smartphone (smartphone), a cordless phone, a wireless data card, a tablet computer, a session initiation protocol (SIP) phone, a wireless local loop (WLL) station, a personal digital assistant (PDA) device, a laptop computer (laptop computer), a machine type communication (MTC) terminal, a handheld device having a wireless communication function, a computing device or another processing device connected to a wireless modem, a vehicle-mounted device, or a wearable device (which may also be referred to as a wearable intelligent device). Alternatively, the terminal may be a terminal in a next-generation communications system, for example, a terminal in a 5G communications system, a terminal in a future evolved PLMN, or a terminal in an NR communications system.

To make the embodiments of this application clearer, some nouns in the embodiments of this application are briefly described below.

1. Antenna Port (Antenna Port)

An antenna port is a logical concept. One antenna port may correspond to one physical transmit antenna, or may correspond to a plurality of physical transmit antennas. In both the cases, a receiver (receiver) of the terminal does not decompose a signal from a same antenna port. The reason is as follows: From a perspective of the terminal, regardless of whether a channel is formed by a single physical transmit antenna or by combining a plurality of physical transmit antennas, a reference signal (Reference Signal) corresponding to the antenna port defines the antenna port. For example, an antenna port corresponding to a demodulation reference signal (DMRS) is a DMRS port, and the terminal may obtain channel estimation of the antenna port based on the reference signal. Each antenna port corresponds to one time-frequency resource grid (time-frequency resource grid), and has its own reference signal. One antenna port is one channel, and the terminal may perform channel estimation and data demodulation based on a reference signal corresponding to the antenna port.

2. Beam (Beam)

A main problem of high-frequency communication is that energy of a signal sharply decreases as a transmission distance increases, resulting in a short transmission distance of the signal. To overcome this problem, an analog beam technology is used in the high-frequency communication, and a large-scale antenna array is used for weighted processing, so that signal energy is concentrated in a relatively small range, to form a signal similar to an optical beam (the signal is referred to as an analog beam, a beam for short), thereby extending a transmission distance.

A beam is a communication resource. The beam may be a wide beam, a narrow beam, or another type of beam. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent by using different beams. Optionally, a plurality of beams with a same communication feature or similar communication features may be considered as one beam. One beam may include one or more antenna ports, and is used to transmit a data channel, a control channel, a sounding signal, and the like. The one or more antenna ports forming the beam may be considered as one antenna port set.

Beams include a transmit beam and a receive beam. The transmit beam may refer to distribution of signal strength formed in different directions in space after a signal is transmitted by using an antenna, and the receive beam may refer to distribution that an antenna array enhances or weakens reception of a radio signal in different directions in space.

In a current NR protocol, beam information may be indicated by using a quasi colocation (QCL) relationship between antenna ports. Specifically, indication information (for example, downlink control information (DCI)) may indicate that one resource (or antenna port) and another resource (or antenna port) have a quasi colocation relationship, to indicate that beams corresponding to the two resources (or antenna ports) have a same spatial characteristic, and a same receive beam may be used for receiving. In a protocol, a beam may be specifically represented by using identifiers of various signals, for example, a resource index of a channel state information reference signal (CSI-RS), an index of a synchronization signal and physical broadcast channel block (synchronization signal/physical broadcast channel block, which may be referred to as an SS/PBCH block for short, or may be referred to as an SSB for short), a resource index of a sounding reference signal (SRS), or a resource index of a tracking reference signal (TRS).

In addition, generally, one beam corresponds to one DMRS port, one transmission configuration indicator (TCI), one TRP, or one sounding reference signal resource indicator (SRI) (used for uplink data transmission). Therefore, different beams may also be represented by using different DMRS ports, TCIs, TRPs, or SRIs.

For ease of description, in the embodiments of this application, a DMRS port and a TC are used as examples to describe the solutions provided in the embodiments of this application. The DMRS port, the TCI, the TRP, the SRI, the resource index of the CSI-RS, the index of the SS/PBCH block, the resource index of the SRS, and the resource index of the TRS each may represent a beam. Therefore, a DMRS port and a TCI in the following descriptions may also be replaced with abeam, a TRP, an SRI, a resource index of a CSI-RS, an index of an SS/PBCH block, a resource index of an SRS, or a resource index of a TRS, and the replacement does not change the essence of the method provided in the embodiments of this application.

3. QCL

A QCL relationship is used to indicate that a plurality of resources have one or more same or similar communication features. For a plurality of resources having a colocation relationship, a same or similar communication configuration may be used. Specifically, signals corresponding to antenna ports that have a QCL relationship have a same parameter; or a parameter (which may also be referred to as a QCL parameter) of an antenna port may be used to determine a parameter of another antenna port that has a QCL relationship with the antenna port; or two antenna ports have a same parameter; or a parameter difference between two antenna ports is less than a threshold. The parameter may include one or more of the following: a delay spread (delay spread), a Doppler spread (Doppler spread), a Doppler shift (Doppler shift), an average delay (average delay), an average gain, and a spatial reception parameter (spatial Rx parameter). The spatial reception parameter may include one or more of the following: an angle of arrival (AOA), an average AOA, an AOA spread, an angle of departure (AOD), an average angle of departure AOD, an AOD spread, a receive antenna spatial correlation parameter, a transmit antenna spatial correlation parameter, a transmit beam, a receive beam, and a resource identifier.

4. TCI

The TCI may be used to indicate QCL information of a physical downlink control channel (PDCCH)/physical downlink shared channel (PDSCH), and may be specifically used to indicate a reference signal that meets a QCL relationship with a DMRS of the PDCCH/PDSCH. In this case, the terminal may receive the PDCCH/PDSCH by using a spatial parameter that is the same as or similar to a spatial parameter of the reference signal.

In the TCI, a reference signal index may be specifically used to indicate the reference signal that meets the QCL relationship with the DMRS of the PDCCH/PDSCH. The TCI may also be referred to as a TCI state (TCI state).

5. Time Unit

In the embodiments of this application, the time unit may be an orthogonal frequency division multiplexing (OFDM) symbol, a mini-slot (mini-slot), a slot (slot), a subframe (subframe), a transmission time interval (TTI), or the like.

6. Repeat Transmission Scheme

Repeat transmission schemes of data may be classified into a time domain repeat transmission scheme, a spatial domain repeat transmission scheme, and a spatial-domain and time-domain repeat transmission scheme (which is referred to as a space-time repeat transmission scheme for short). The time domain repeat transmission scheme is a data transmission scheme in which one RV of a TB is transmitted in each of a plurality of time units in the conventional technology and that is described in Background, and data transmission efficiency in the repeat transmission scheme is relatively low. Therefore, the embodiments of this application provide the spatial domain repeat transmission scheme and the space-time repeat transmission scheme, to improve data transmission efficiency. For specific meanings of the spatial domain repeat transmission scheme and the space-time repeat transmission scheme, refer to the following descriptions.

To make the embodiments of this application clearer, the following briefly describes a processing process of data at a physical layer.

Figure 2:
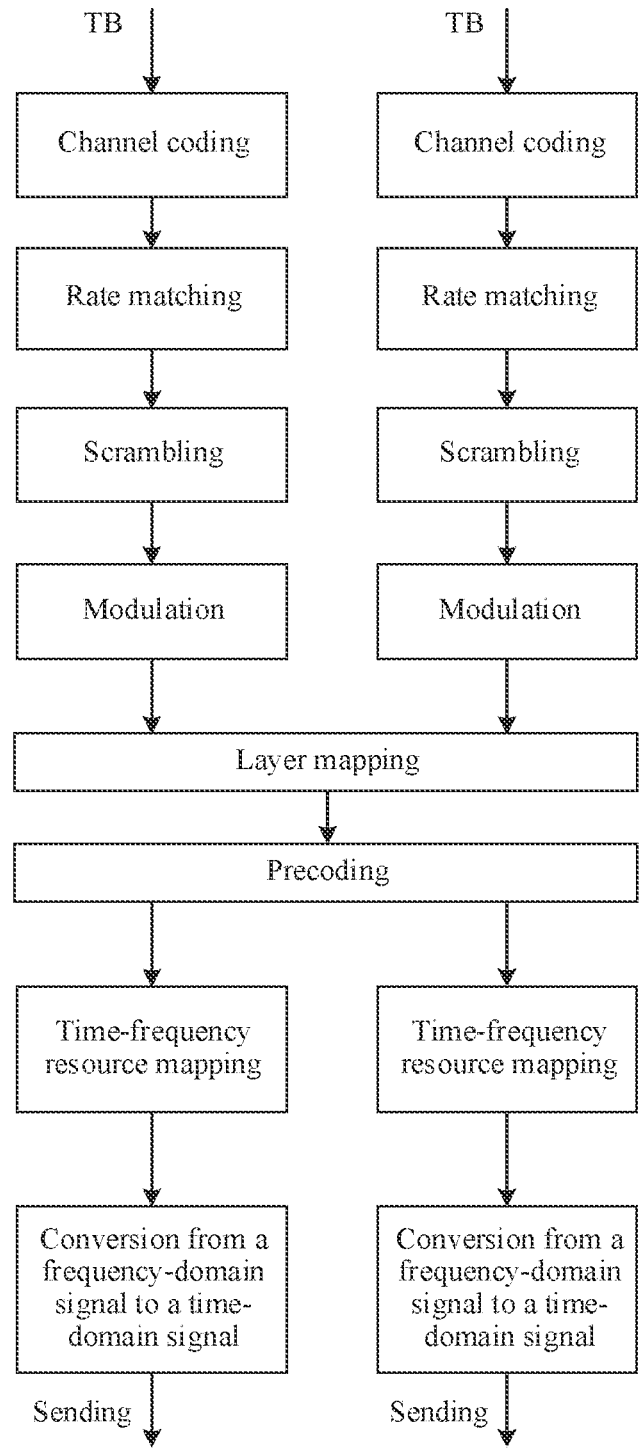
FIG. 2 is a schematic diagram of a processing process of a data packet at a physical layer.

Data sent from a media access control (MAC) layer to the physical layer is organized in a form of a TB. One TB or a plurality of TBs may be sent from the MAC layer to the physical layer. Referring to FIG. 2, two TBs are used as an example for description in FIG. 2. A transmit end performs channel coding (turbo coder), rate matching, scrambling (scrambling), modulation (modulation), layer mapping (layer mapping), precoding (precoding), and time-frequency resource mapping on each TB, converts a signal obtained after the time-frequency resource mapping into a time-domain signal, and sends the time-domain signal.

After channel coding and rate matching are performed on one TB, four RVs may be generated. One RV is transmitted each time. A receive end may receive different RVs of a same TB, and combine these RVs for decoding. Data obtained after the rate matching is further scrambled and modulated, to obtain a constellation symbol. After layer mapping is performed on the constellation symbol, the constellation symbol is mapped to one or more transport layers (transport layers, also generally referred to as layers). Each layer corresponds to one valid data flow. A data flow at each layer is precoded, to obtain a precoded data flow. Precoding is a process of mapping a layer (layer) to an antenna port (antenna port) by using a precoding matrix. The precoded data flow is mapped to a time-frequency resource, and then is converted into a time-domain signal for sending.

A data transmission method provided in the embodiments of this application is described below by using an example in Embodiment 1 and Embodiment 2. In Embodiment 1, a network device sends a plurality of pieces of first data to a terminal in one time unit by using a plurality of DMRS ports or a plurality of TCIs. All the first data sent in the time unit is generated based on a same piece of second data. In Embodiment 2, a network device sends a plurality of pieces of first data in at least one of a plurality of time units by using a plurality of DMRS ports or a plurality of TCIs. In addition, all first data sent in the plurality of time units is generated based on a same piece of second data.

In descriptions of the embodiments of this application, an "RV x" is an RV whose index is "x", where x is an integer greater than or equal to 0 and less than or equal to 3. A "same RV" is an RV with a same index, and "different RVs" are RVs with different indexes. "*" in the embodiments of this application" refers to "multiply".

Embodiment 1

Figure 3:
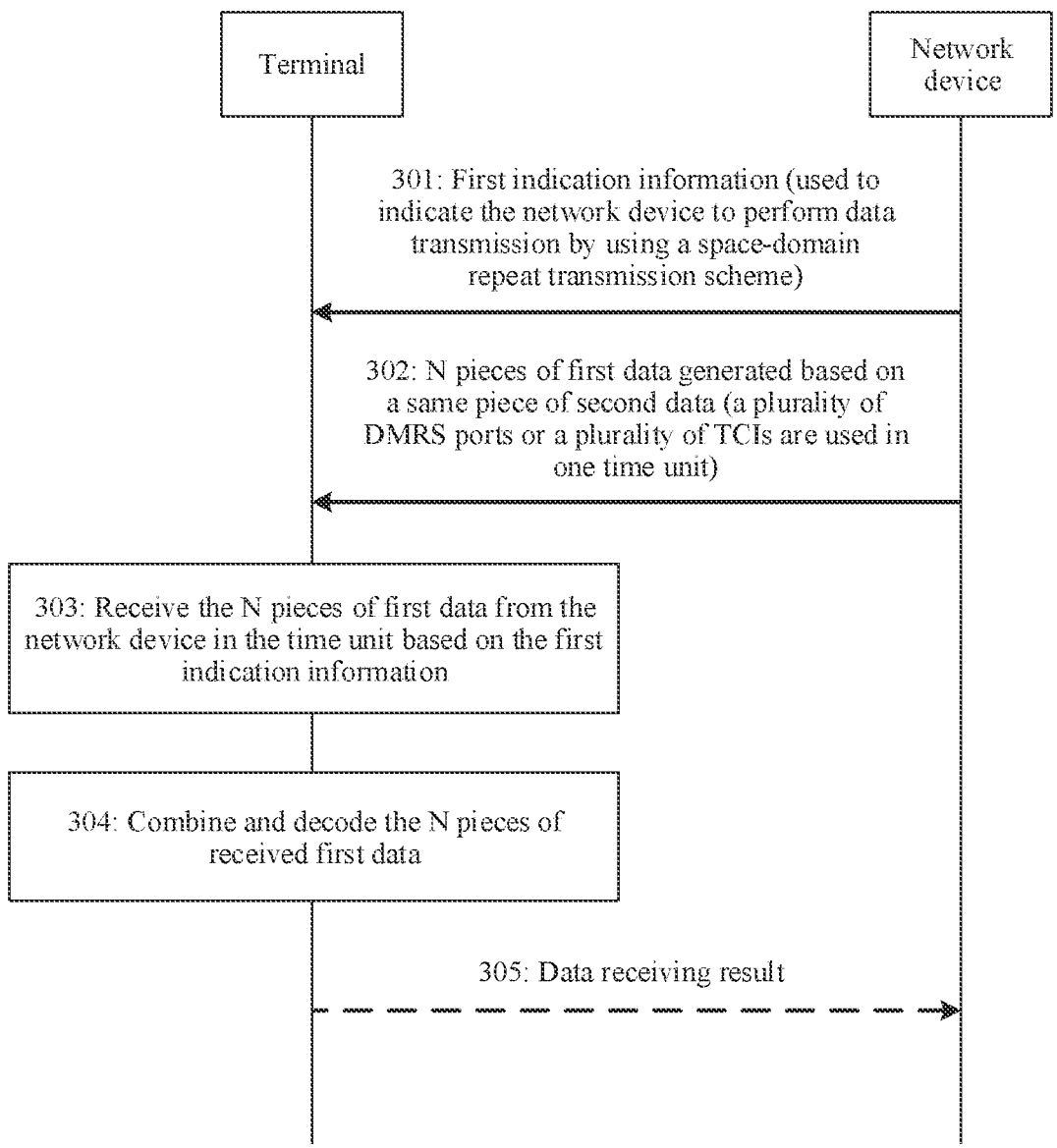
FIG. 3 and FIG. 4 each are a flowchart of a data transmission method according to an embodiment of this application.

Referring to FIG. 3, a method provided in Embodiment 1 includes the following steps.

301: A network device sends first indication information to a terminal, where the first indication information is used to indicate the network device to perform data transmission by using a spatial domain repeat transmission scheme.

The spatial domain repeat transmission scheme is a transmission scheme in which N pieces of first data are sent in one time unit by using a plurality of DMRS ports or a plurality of TCIs, the N pieces of first data are generated based on a same piece of second data, and N is an integer greater than 1. The transmission scheme having the feature may also have another name, for example, a first transmission scheme, a transmission scheme A, or a transmission scheme B. This is not limited in this application.

The first indication information may be indicated by using one field. For example, a name of the field may be RepetitionFactorDL.

In a first possible implementation, the field is a switch field, and may be set to a specific value, for example, 0/1, on/off, true/false, or enabled/disabled. A specific form is not limited. When the field is set to be in an on state (for example, 1/on/true/enabled or another form), it indicates that the network device uses the spatial domain repeat transmission scheme. When the field is set to be in an off state (for example, 0/off/false/disabled or another form), it indicates that the network device does not use the spatial domain repeat transmission scheme. Alternatively, when the field is set to be in an off state, it indicates that the network device uses the spatial domain repeat transmission scheme; or when the field is set to be in an on state, it indicates that the network device does not use the spatial domain repeat transmission scheme.

In a second possible implementation, the field may be set to a specific value. When the value is set to a value greater than k, it indicates that the network device uses the spatial domain repeat transmission scheme. When the value is set to a value less than or equal to k or is not set, it indicates that the network device does not use the spatial domain repeat transmission scheme. A value of k may be 1. A value of k may alternatively be a positive integer other than 1.

Certainly, the first indication information may alternatively be indicated by using a plurality of fields. This is not limited in this embodiment of this application.

A correspondence between a DMRS port and first data may be a many-to-one correspondence (that is, one piece of first data is sent by using a plurality of DMRS ports), a one-to-many correspondence (that is, a plurality of pieces of first data are sent by using one DMRS port), or a one-to-one correspondence (that is, one piece of first data is sent by using one DMRS port). When one piece of first data is sent by using one DMRS port, N pieces of first data are sent in one time unit by using N DMRS ports.

Similarly, a correspondence between a TCI and first data may be a many-to-one correspondence (that is, one piece of first data is sent by using a plurality of TCIs), a one-to-many correspondence (that is, a plurality of pieces of first data are sent by using one TCI), or a one-to-one correspondence (that is, one piece of first data is sent by using one TCI). When one piece of first data is sent by using one TCI. N pieces of first data are sent in one time unit by using N TCIs.

For example, the first data may be a TB or an RV.

When the first data is a TB, the N pieces of first data may be N different TBs generated based on a same piece of upper layer data (for example, a MAC PDU, where the PDU is a protocol data unit (protocol data unit); in this case, the MAC PDU is the same piece of second data). That is, a same MAC PDU is replicated into N copies, and one copy of the MAC PDU is one TB (that is, one copy of the MAC PDU is one piece of first data).

When the first data is an RV, the N pieces of first data may be N RVs generated based on a same TB (in this case, the same TB is the same piece of second data). In this case, the second data is a TB, and the N pieces of first data may correspond to a plurality of different RVs of the same piece of second data, or the N pieces of first data may correspond to a same RV of the same piece of second data. For example, assuming that N=4, if the N pieces of first data are respectively an RV 0 of a TB 1, an RV 1 of the TB 1, an RV 2 of the TB 1, and an RV 3 of the TB 1, the N pieces of first data correspond to four different RVs of the same piece of second data. If the N pieces of first data are respectively an RV 0 of a TB 1, the RV 0 of the TB 1, an RV 2 of the TB 1, and the RV 2 of the TB 1, the N pieces of first data correspond to two different RVs of the same piece of second data. If the N pieces of first data are respectively an RV 0 of a TB 1, the RV 0 of the TB 1, the RV 0 of the TB 1, and the RV 0 of the TB 1, the N pieces of first data correspond to a same RV of the same piece of second data.

When the first data is an RV, the N pieces of first data may alternatively be N RVs of N TBs generated based on a same piece of upper layer data (in this case, the same piece of upper layer data is the same piece of second data), that is, one piece of first data is one RV of one TB. For example, N=2. If the N TBs are respectively a TB 1 and a TB 2, the N RVs of the N TBs are respectively an RV 0 of the TB 1 and an RV 1 of the TB 2, one of the N pieces of first data is the RV 0 of the TB 1, and the other piece of first data is the RV 1 of the TB 2.

Indexes of RVs corresponding to different first data sent by using different DMRS ports or different TCIs may be different, or may be the same. If a plurality of pieces of first data are sent by using one DMRS port or one TCI, indexes of RVs corresponding to the plurality of pieces of first data may be different, or may be the same.

302: The network device sends N pieces of first data in one time unit by using a plurality of DMRS ports or a plurality of TCIs.

When one piece of first data is sent by using one DMRS port or one TCI, during specific implementation, step 302 includes: The network device sends the N pieces of first data to the terminal in the time unit by using N DMRS ports or N TCIs.

303: The terminal receives the first indication information from the network device, and receives the N pieces of first data from the network device in the time unit based on the first indication information.

304: The terminal combines and decodes the N pieces of received first data.

Step 304 provides only one manner of processing the N pieces of first data by the terminal. During specific implementation, the terminal may alternatively separately decode only the first data received by using each DMRS port or each TCI, or may combine and decode the N pieces of first data and one or more pieces of previously received data that are also generated based on the same piece of second data.

When the N pieces of first data correspond to a plurality of different RVs, a decoding success rate can be improved by performing combined decoding on the received first data.

Optionally, after step 304, the method further includes the following step:

305: The terminal sends a data receiving result to the network device.

The data receiving result may be an acknowledgement (ACK) or a negative acknowledgement (NACK). The data receiving result may be used to feed back one or more of a first decoding result, a second decoding result, and a third decoding result to the network device. The first decoding result is a decoding result of separately decoding, by the terminal, the first data received by using each DMRS port or each TCI. The second decoding result is a result of performing combined decoding on the N pieces of first data by the terminal. The third decoding result is a result of performing combined decoding, by the terminal, on the N pieces of first data and the one or more pieces of previously received data that are also generated based on the same piece of second data.

According to the method provided in this embodiment of this application, the network device may send, in a same time unit by using a plurality of DMRS ports or a plurality of TCIs, a plurality of pieces of first data generated by using a same piece of second data. Compared with sending a plurality of different RVs of a same TB in a plurality of consecutive time units, this can reduce a data transmission delay and improve data transmission efficiency while ensuring data transmission reliability.

When the N pieces of first data correspond to the N RVs of the same piece of second data, the terminal can perform combined decoding only when learning of indexes of the RVs corresponding to the N pieces of first data. In this case, the method may further include: The network device sends second indication information to the terminal. Correspondingly, the terminal receives the second indication information from the network device. For a function of the second indication information, refer to Example 1 or Example 2.

Example 1

The second indication information is used to indicate an index of one of N RVs (which is denoted as a first RV), the N RVs are in a one-to-one correspondence with the N pieces of first data, and an index of the first RV in the N RVs to an index of an $N^{th}$ RV in the N RVs satisfy a preset cyclic order.

An index of an $n^{th}$ RV in the N RVs is an index of an RV corresponding to first data sent by the network device by using an $n^{th}$ DMRS port (or an $n^{th}$ TCI), and n is an integer greater than 0 and less than or equal to N. The first RV may be an index of an RV corresponding to first data sent by the network device by using the $n^{th}$ DMRS port (or TCI)/a DMRS port (or TCI) with the $n^{th}$ smallest number/a DMRS port (or TCI) with the $n^{th}$ largest number, or may be an index of an RV corresponding to first data sent by using a DMRS port (or TCI) with a smallest (or largest) number.

It should be noted that numbers of the N RVs in this embodiment of this application may start from 0 or may start from 1. When the numbers of the N RVs start from 0, an RV numbered n−1 is the $n^{th}$ RV in the N RVs. Numbers of the N DMRS ports may start from 0 or may start from 1. When the numbers of the N DMRS ports start from 0, a DMRS port numbered n−1 is the $n^{th}$ DMRS ports in the N DMRS ports. Numbers of the N TCIs may start from 0 or may start from 1. When the numbers of the N TCIs start from 0, a TCI numbered n−1 is the $n^{th}$ TCI in the N TCIs. In Embodiment 1 of this application, an example in which the numbers of the N RVs, the numbers of the N DMRS ports, and the numbers of the N TCIs all start from 0 is used to describe the method provided in this embodiment of this application.

The preset cyclic order that the indexes of the N RVs satisfy may include indexes of RVs of all types (RVs with different indexes are RVs of different types). For example, referring to Table 1, the preset cyclic order that the indexes of the N RVs satisfy may be: 0→2→3→1→0→2→3→1→ .... That is, if an index of an RV corresponding to a DMRS port or a TCI numbered 0 is 0, an index of an RV corresponding to a DMRS port or a TCI numbered 1 is 2, an index of an RV corresponding to a DMRS port or a TC numbered 2 is 3, an index of an RV corresponding to a DMRS port or a TCI numbered 3 is 1, an index of an RV corresponding to a DMRS port or a TC numbered 4 is also 0, and so on. Based on the cyclic order, the terminal can calculate, based on an index that is of an RV corresponding to one DMRS port or TCI and that is indicated by the second indication information, indexes of RVs corresponding to all DMRS ports or all TCIs. For example, the second indication information indicates the index of the RV corresponding to the DMRS port or the TCI numbered 0, and the index is 2. In this case, the index of the RV corresponding to the DMRS port or the TCI numbered 1 is 3; the index of the RV corresponding to the DMRS port or the TCI numbered 2 is 1; and the index of the RV corresponding to the DMRS port or the TC numbered 3 is 0. In this embodiment of this application, an RV corresponding to a DMRS port or a TC is an RV corresponding to first data sent by using the DMRS port or the TCI.

The preset cyclic order that the indexes of the N RVs satisfy may alternatively be 0→1→2→3→0→1→2→3→ . . . .

TABLE 1

| Index that is of an RV and that is indicated by second indication information | Index of an RV corresponding to first data sent by a network device by using a DMRS port numbered n' or a TCI numbered n' | | | |
|---|---|---|---|---|
| | n' mod 4 = 0 | n' mod 4 = 1 | n' mod 4 = 2 | n' mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Note: mod is a modulo function, and n' is an integer greater than or equal to 0 and less than N.

The preset cyclic order that the indexes of the N RVs satisfy may alternatively include indexes of RVs of some types. For example, the preset cyclic order that the indexes of the N RVs satisfy may be: 0→1→0→1→0→1→ . . . .

The preset cyclic order that the indexes of the N RVs satisfy may alternatively include an index of an RV of a single type. For example, the preset cyclic order that the indexes of the N RVs satisfy may be: 0→0→0→ . . . .

When the function of the second indication information is described in Example 1, during specific implementation, step 304 may include the following steps:
(11) The terminal combines the N pieces of received first data based on the second indication information.
(12) The terminal decodes the N pieces of combined first data.

During specific implementation, step (11) may include the following steps:
(21) The terminal determines, based on the second indication information and the preset cyclic order that the indexes of the N RVs satisfy, the index of the RV corresponding to each of the N pieces of first data.
(22) The terminal combines the N pieces of first data based on the index of the RV corresponding to each of the N pieces of first data.

During specific implementation of step (21), the terminal may calculate the indexes of the N RVs based on the index that is of the RV and that is indicated by the second indication information and the preset cyclic order that the indexes of the N RVs satisfy. Based on the example shown in Table 1, if the index that is of the RV and that is indicated by the second indication information is the index of the RV corresponding to the DMRS port or the TCI numbered 0, and the index of the RV is 0, the terminal may determine, based on Table 1, that the index of the RV corresponding to the DMRS port or the TCI numbered 1 is 2, the index of the RV corresponding to the DMRS port or the TC numbered 2 is 3, the index of the RV corresponding to the DMRS port or the TC numbered 3 is 1, the index of the RV corresponding to the DMRS port or the TC numbered 4 is also 0, and so on.

When the function of the second indication information is described in Example 1, the network device may not indicate, to the terminal, the index of the RV corresponding to each of the N pieces of first data, thereby reducing signaling overheads.

Example 2

The second indication information is used to indicate an index of an RV corresponding to each of the N pieces of first data.

During specific implementation of Example 2, the second indication information may indicate indexes of N RVs, an index that is of an $n^{th}$ RV and that is indicated by the second indication information is an index of an RV corresponding to first data sent by the network device by using an $n^{th}$ DMRS port (or TCI)/a DMRS port (or TCI) with the $n^{th}$ smallest number/a DMRS port (or TCI) with the $n^{th}$ largest number. The second indication information may be indicated by using 2*N bits, and every 2 bits are used to indicate an index of one of the N RVs. When the indexes of the N RVs are the same, the second indication information may include 2 bits, and the 2 bits are used to indicate the indexes of the N RVs.

When the function of the second indication information is described in Example 2, during specific implementation, step 304 may include the following steps:
(31) The terminal combines the N pieces of received first data based on the second indication information.
(32) The terminal decodes the N pieces of combined first data.

During specific implementation, step (31) may include the following steps:
(41) The terminal determines, based on the second indication information, the index of the RV corresponding to each of the N pieces of first data.
(42) The terminal combines the N pieces of first data based on the index of the RV corresponding to each of the N pieces of first data.

During specific implementation of step (41), the terminal may perform no calculation, but directly determine, based on the second indication information, the index of the RV corresponding to each of the N pieces of first data.

The second indication information in Example 1 and Example 2 may be carried in DCI, and the DCI may be sent to the terminal in the time unit. When the function of the second indication information is described in Example 2, the DCI may be extended DCI. In Example 2, the DCI may include indexes of N RVs of a same TB, and the same TB herein is the same piece of second data.

It should be noted that, the solution in Example 1 and the solution in Example 2 in Embodiment 1 do not depend on step 301 to step 303, and both may be independently implemented. In the case of independent implementation, these independent solutions may also be combined with other solutions in the embodiments of this application, and this is not limited in this embodiment of this application.

Optionally, the method further includes the following step:
(51) The network device sends third indication information to the terminal. Correspondingly, the terminal receives the third indication information from the network device. The third indication information is used to indicate a quantity of DMRS ports used by the network device to send the first data in the time unit; or the third indication information is used to indicate a quantity of TRPs used by the network device to send the first data in the time unit, and the network device sends one piece of first data by using one TRP; or the third indication information is used to indicate a quantity of TCIs used by the network device to send the first data in the time unit; or the third indication information is used to indicate a quantity of the first data sent by the network device in the time unit; or the third indication information is used to indicate a quantity of different RVs corresponding to the first data sent by the network device in the time unit.

In this case, during specific implementation, step 303 may include: The terminal receives the N pieces of first data from the network device in the time unit based on the first indication information and the third indication information.

Specifically, the terminal may determine, based on the third indication information, the quantity of the first data sent by the network device, to receive the N pieces of first data.

The first indication information and the third indication information are same indication information, or may be different indication information.

A possible method in which the first indication information and the third indication information are the same indication information is that, the first indication information is indicated by using one field, and the field may be set to a specific value. The value is used to indicate a quantity of DMRS ports used by the network device to send the first data in the time unit; or the value is used to indicate a quantity of TRPs used by the network device to send the first data in the time unit; or the value is used to indicate a quantity of TCIs used by the network device to send the first data in the time unit; or the value is used to indicate a quantity of the first data sent by the network device in the time unit; or the value is used to indicate a quantity of different RVs corresponding to the first data sent by the network device in the time unit. When the value is set to a value greater than k, the value is further used to indicate that the network device uses the spatial domain repeat transmission scheme. When the value is set to a value less than or equal to k or is not set, it indicates that the network device does not use the spatial domain repeat transmission scheme. A value of k may be 1. A value of k may alternatively be a positive integer other than 1.

Another possible method in which the first indication information and the third indication information are the same indication information is that, the first indication information includes a plurality of fields, one field is a switch field, used to indicate whether to use the spatial domain repeat transmission scheme, and another field is a value field, used to indicate a quantity of DMRS ports used by the network device to send the first data in the time unit; or used to indicate a quantity of TRPs used by the network device to send the first data in the time unit, or used to indicate a quantity of TCIs used by the network device to send the first data in the time unit; or used to indicate a quantity of the first data sent by the network device in the time unit; or used to indicate a quantity of different RVs corresponding to the first data sent by the network device in the time unit.

Any one or more of the first indication information, the second indication information, and the third indication information in Embodiment 1 may be carried in radio resource control (RRC) signaling, MAC control element (MAC CE) signaling, or DCI.

With reference to Embodiment 1, in another embodiment, any two of the N pieces of first data occupy different frequency domain resources. For example, if same TBs are simultaneously transmitted by using two TCIs, the two TCIs correspond to different frequency domain resources.

With reference to Embodiment 1, in another embodiment, when the N pieces of first data are sent in one time unit by using a plurality of DMRS ports, a correspondence between a TC and first data may be a many-to-one correspondence, a one-to-many correspondence, or a one-to-one correspondence. When the N pieces of first data are sent in one time unit by using a plurality of TCIs, a correspondence between a DMRS port and first data may be a many-to-one correspondence, a one-to-many correspondence, or a one-to-one correspondence.

Embodiment 2

Figure 4:
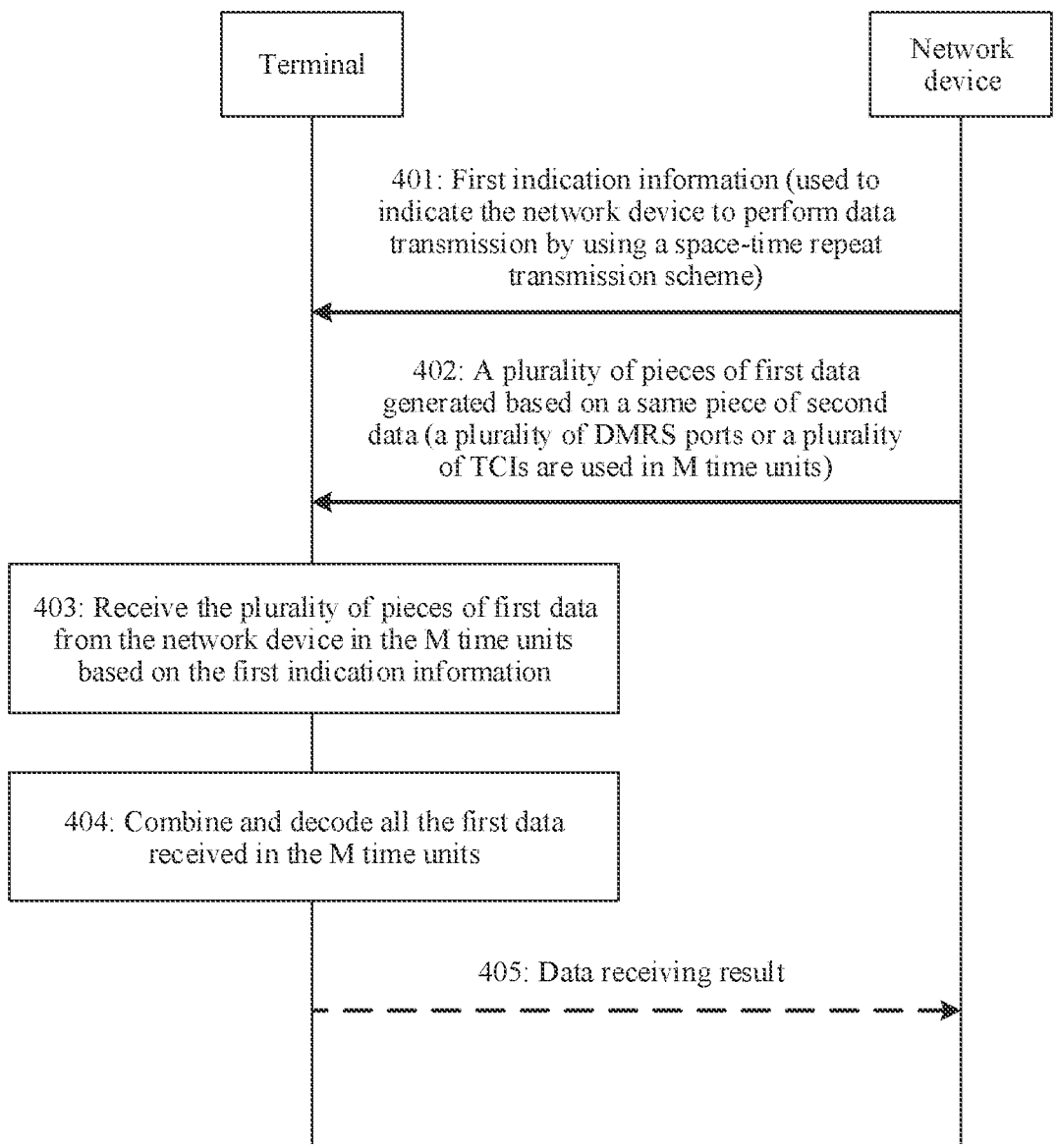

As shown in FIG. 4, a data transmission method provided in Embodiment 2 includes the following steps.

401: A network device sends first indication information to a terminal, where the first indication information is used to indicate the network device to perform data transmission by using a space-time repeat transmission scheme.

The space-time repeat transmission scheme is a transmission scheme in which first data is sent in M time units by using a plurality of DMRS ports or a plurality of TCIs, the network device sends a plurality of pieces of first data in at least one of the M time units by using a plurality of DMRS ports or a plurality of TCIs, all the first data sent in the M time units is generated based on a same piece of second data, and M is an integer greater than 1. The transmission scheme having the feature may also have another name, for example, a second transmission scheme. This is not limited in this application. The M time units may be a plurality of consecutive time units, or may be a plurality of nonconsecutive time units.

When the network device indicates, to the terminal, whether to perform data transmission by using the space-time repeat transmission scheme, separate indication (denoted as an indication manner 1) or combined indication (denoted as an indication manner 2) may be performed. The following separately describes the two indication manners.

Indication Manner 1: Separate Indication

In this case, the first indication information may be indicated by using one field.

In a first possible implementation, the field is a switch field, and may be set to a specific value, for example, 0/1, on/off, true/false, or enabled/disabled. When the field is set to be in an on state (for example, 1/on/true/enabled or another form), it indicates that the network device uses the space-time repeat transmission scheme. When the field is set to be in an off state (for example, 0/off/false/disabled or another form), it indicates that the network device does not use the space-time repeat transmission scheme. Alternatively, when the field is set to be in an off state, it indicates that the network device uses the space-time repeat transmission scheme; or when the field is set to be in an on state, it indicates that the network device does not use the space-time repeat transmission scheme.

In a second possible implementation, the field may be set to a specific value. When the value is set to a value greater than k, it indicates that the network device uses the space-time repeat transmission scheme. When the value is set to a value less than or equal to k or is not set, it indicates that the network device does not use the space-time repeat transmission scheme. A value of k may be 1. A value of k may alternatively be a positive integer other than 1.

Indication Manner 2: Combined Indication

In this case, the first indication information may include two fields, and whether to use the space-time repeat transmission scheme is indicated by using both the two fields. Whether to use a time domain repeat transmission scheme is indicated by using one field, for example, indicated by using an aggregationFactorDL parameter in the current R15 protocol, and when the aggregationFactorDL>1, it indicates that the network device uses the time domain repeat transmission scheme. Whether to use a spatial domain repeat transmission scheme (for a specific meaning, refer to Embodiment 1) is indicated by using the other field, for example, indicated by using a RepetitionFactorDL parameter. The two fields may be included in a same message, or may be included in different messages. The RepetitionFactorDL and the aggregationFactorDL may be independently configured.

Figure 5:
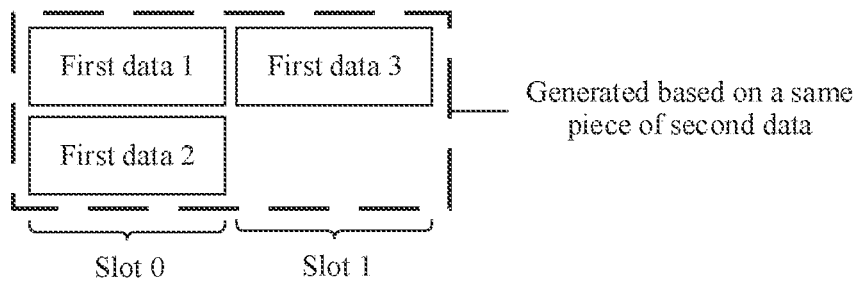
FIG. 5 to FIG. 8 each are a schematic diagram of a time domain position for sending first data according to an embodiment of this application.
Figure 6:
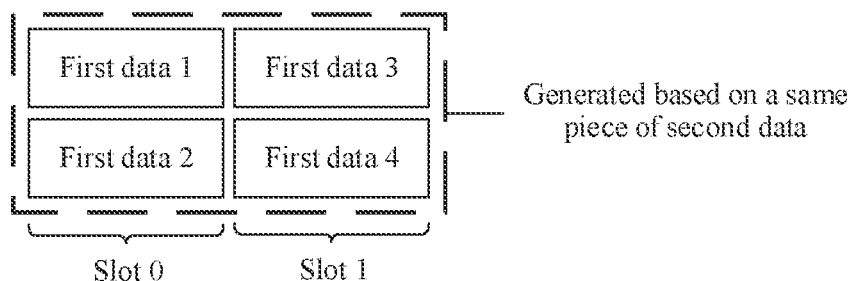

In the foregoing embodiment, quantities of first data sent by the network device in different time units may be the same, or may be different. For example, referring to FIG. 5, when the time unit is a slot, quantities of first data sent by the network device in different slots are different. Referring to FIG. 6, when the time unit is a slot, quantities of first data sent by the network device in different slots are the same.

In one time unit, a correspondence between a DMRS port and first data may be a many-to-one correspondence (that is, one piece of first data is sent by using a plurality of DMRS ports), a one-to-many correspondence (that is, a plurality of pieces of first data are sent by using one DMRS port), or a one-to-one correspondence (that is, one piece of first data is sent by using one DMRS port). When one piece of first data is sent by using one DMRS port, and the network device sends N (N is an integer greater than 1) pieces of first data in the time unit, N pieces of first data are sent in one time unit by using N DMRS ports.

Similarly, in one time unit, a correspondence between a TCI and first data may be a many-to-one correspondence (that is, one piece of first data is sent by using a plurality of TCIs), a one-to-many correspondence (that is, a plurality of pieces of first data are sent by using one TCI), or a one-to-one correspondence (that is, one piece of first data is sent by using one TCI). When one piece of first data is sent by using one TCI, and the network device sends N pieces of first data in the time unit, N pieces of first data are sent in one time unit by using N TCIs.

The first data may be a TB or an RV. It is assumed that the network device sends Q pieces of first data in the M time units.

When the first data is a TB, the Q pieces of first data may be Q different TBs generated based on a same piece of upper layer data (for example, a MAC PDU, where in this case, the MAC PDU is the same piece of second data). That is, a same MAC PDU is replicated into Q copies, and one copy of the MAC PDU is one TB (that is, one copy of the MAC PDU is one piece of first data).

When the first data is an RV, the Q pieces of first data may be Q RVs of a plurality of TBs generated based on a same piece of upper layer data (in this case, the same piece of upper layer data is the same piece of second data), that is, one piece of first data is one RV of one TB. For example, if the plurality of TBs are respectively a TB 1 and a TB 2, and the Q RVs of the plurality of TBs are respectively an RV 0 of the TB 1, an RV 1 of the TB 1, an RV 0 of the TB 2, and an RV 1 of the TB 2, the Q pieces of first data are respectively the RV 0 of the TB 1, the RV 1 of the TB 1, the RV 0 of the TB 2, and the RV 1 of the TB 2.

When the first data is an RV, the Q pieces of first data may alternatively be Q RVs generated based on a same TB (in this case, the same TB is the same piece of second data). In this case, the second data is a TB, and the Q pieces of first data may correspond to a plurality of different RVs of the same piece of second data, or the Q pieces of first data may correspond to a same RV of the same piece of second data. For example, assuming that Q=4, if the Q pieces of first data are respectively an RV 0 of a TB 1, an RV 1 of the TB 1, an RV 2 of the TB 1, and an RV 3 of the TB 1, the Q pieces of first data correspond to four different RVs of the same piece of second data. If the Q pieces of first data are respectively an RV 0 of a TB 1, the RV 0 of the TB 1, an RV 2 of the TB 1, and the RV 2 of the TB 1, the Q pieces of first data correspond to two different RVs of the same piece of second data. If the Q pieces of first data are respectively an RV 0 of a TB 1, the RV 0 of the TB 1, the RV 0 of the TB 1, and the RV 0 of the TB 1, the Q pieces of first data correspond to a same RV of the same piece of second data.

Figure 7:
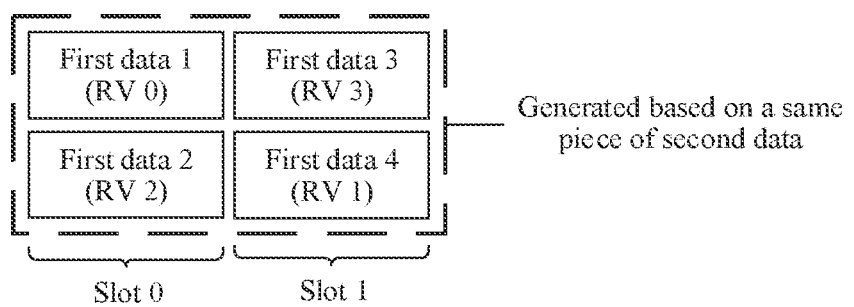

When the network device sends one piece of first data by using one DMRS port or one TCI, and sends N pieces of first data in each time unit, in a possible implementation, the second data is a TB, and the N pieces of first data sent by the network device in each of the M time units correspond to a plurality of different RVs of the same piece of second data. For example, referring to FIG. 7, when the M time units are a slot 0 and a slot 1, an index (namely, an RV 0) of an RV corresponding to first data 1 sent by the network device in the slot 0 is different from an index (namely, an RV 2) of an RV corresponding to first data 2 sent by the network device in the slot 0, and an index (namely, an RV 3) of an RV corresponding to first data 3 sent by the network device in the slot 1 is also different from an index (namely, an RV 1) of an RV corresponding to first data 4 sent by the network device in the slot 1.

Figure 8:
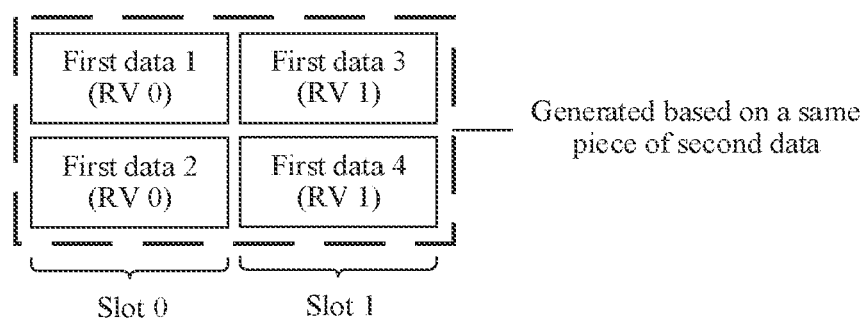

When the network device sends one piece of first data by using one DMRS port or one TCI, and sends N pieces of first data in each time unit, in another possible implementation, the second data is a TB, the N pieces of first data sent by the network device in each of the M time units correspond to a same RV of the same piece of second data, and first data sent by the network device in different time units in the M time units corresponds to a plurality of different RVs of the same piece of second data. For example, referring to FIG. 8, when the M time units are a slot 0 and a slot 1, indexes of RVs corresponding to first data 1 and first data 2 that are sent by the network device in the slot 0 are the same (both are an RV 0), indexes of RVs corresponding to first data 3 and first data 4 that are sent by the network device in the slot 1 are also the same (both are an RV 1), but the index (namely, the RV 0) of the RV corresponding to the first data sent by the network device in the slot 0 is different from the index (namely, the RV 1) of the RV corresponding to the first data sent by the network device in the slot 1.

In addition, when the network device sends one piece of first data by using one DMRS port or one TCI, and sends N pieces of first data in each time unit, for each time unit, when the first data is a TB, the N pieces of first data may be N different TBs generated based on a same piece of upper layer data. When the first data is an RV, the N pieces of first data may be N RVs generated based on a same TB, or the N pieces of first data may be N RVs of N TBs generated based on a same piece of upper layer data, that is, one piece of first data is one RV of one TB. For specific descriptions of this part, refer to descriptions of a corresponding part in Embodiment 1. Details are not described herein again.

Indexes of RVs corresponding to different first data sent by using different DMRS ports or different TCIs may be different, or may be the same. If a plurality of pieces of first data are sent by using one DMRS port or one TCI, indexes of RVs corresponding to the plurality of pieces of first data may be different, or may be the same.

402: The network device sends a plurality of pieces of first data to the terminal in the M time units by using a plurality of DMRS ports or a plurality of TCIs.

The network device sends a plurality of pieces of first data in at least one of the M time units by using a plurality of DMRS ports or a plurality of TCIs. When one piece of first data is sent by using one DMRS port or one TCI, and N pieces of first data are sent in each time unit, during specific implementation, step 402 includes: The network device sends the N pieces of first data to the terminal in each of the M time units by using N DMRS ports or N TCIs.

403: The terminal receives the first indication information from the network device, and receives the plurality of pieces of first data from the network device in the M time units based on the first indication information.

The terminal receives the plurality of pieces of first data in at least one of the M time units. When the network device sends one piece of first data by using one DMRS port or one TCI, and sends N pieces of first data in each time unit, during specific implementation, step 403 includes: The terminal receives the N pieces of first data from the network device in each of the M time units based on the first indication information.

404: The terminal combines and decodes all the first data received in the M time units.

Step 404 provides only one manner of processing, by the terminal, the first data received in the M time units. During specific implementation, the terminal may alternatively separately decode only the first data received by using each DMRS port or each TCI, or may combine and decode first data received in a same time unit, or may combine and decode all the first data received in the M time units and one or more pieces of previously received data that are also generated based on the same piece of second data.

When the plurality of pieces of first data correspond to a plurality of different RVs, a decoding success rate can be improved by performing combined decoding on the received first data.

Optionally, after step 404, the method further includes the following step:

405: The terminal sends a data receiving result to the network device.

The data receiving result may be an ACK or a NACK. The data receiving result may be used to feed back one or more of a first decoding result, a second decoding result, a third decoding result, and a fourth decoding result to the network device. The first decoding result is a decoding result of separately decoding, by the terminal, the first data received by using each DMRS port or each TCI. The second decoding result is a decoding result of combining and decoding first data received in a same time unit. The third decoding result is a decoding result of combining and decoding all the first data received in the M time units. The fourth decoding result is a decoding result of combining and decoding all the first data received in the M time units and the one or more pieces of previously received data that are also generated based on the same piece of second data.

According to the method provided in this embodiment of this application, the network device may send, in one of a plurality of time units by using at least a plurality of DMRS ports or a plurality of TCIs, a plurality of pieces of first data generated by using a same piece of second data. Compared with sending a plurality of different RVs of a same TB in a plurality of consecutive time units, this can reduce a data transmission delay and improve data transmission efficiency while ensuring data transmission reliability.

To enable the terminal to correctly combine all the received first data, the terminal may further learn of an index of an RV corresponding to each piece of received first data. In this case, the foregoing method may further include: The network device sends second indication information to the terminal. Correspondingly, the terminal receives the second indication information from the network device. For a function of the second indication information, refer to Example 1 or Example 2. In Example 1 and Example 2, an example in which the network device sends the N pieces of first data in each of the M time units is used for description. Principles in other cases are also the same as this, and details are not described again.

Example 1

In Example 1, the terminal learns, based on a preset cyclic order that indexes of RVs satisfy, an index of an RV corresponding to each piece of received first data. In different scenarios, functions of the second indication information are slightly different, and descriptions are separately provided below.

Scenario 1: Indexes of RVs corresponding to all the first data sent by the network device in the M time units satisfy a preset cyclic order.

In Scenario 1, the second indication information is used to indicate an index of one of M*N RVs (which is denoted as a first RV); the M*N RVs are in a one-to-one correspondence with M*N pieces of first data; the M*N pieces of first data are all the first data sent by the network device in the M time units; and an index of the first RV in the M*N RVs to an index of an $M*N^{th}$ RV in the M*N RVs satisfy a preset cyclic order.

An index of an RV mn in the M*N RVs is an index of an RV corresponding to first data sent by the network device by using an $n^{th}$ DMRS port (or an $n^{th}$ TCI) in an $m^{th}$ time unit, the RV mn is an RV corresponding to an $n^{th}$ piece of first data sent in the $m^{th}$ time unit, m is an integer greater than 0 and less than or equal to M, and n is an integer greater than 0 and less than or equal to N. For example, the first RV may be an RV corresponding to first data sent by the network device in the first time unit or an $M^{th}$ time unit by using the $n^{th}$ DMRS port (or TCI)/a DMRS port (or TCI) with the $n^{th}$ smallest number/a DMRS port (or TCI) with the $n^{th}$ largest number, or the first RV may be an RV corresponding to first data sent in the first time unit or an $M^{th}$ time unit by using a DMRS port (or TCI) with a smallest (or largest) number.

It should be noted that numbers of the M time units in this embodiment of this application may start from 0 or may start from 1. When the numbers of the M time units start from 0, a time unit numbered m−1 is the $m^{th}$ time unit in the M time units. Numbers of the N DMRS ports may start from 0 or may start from 1. When the numbers of the N DMRS ports start from 0, a DMRS port numbered n−1 is the $n^{th}$ DMRS ports in the N DMRS ports. Numbers of the N TCIs may start from 0 or may start from 1. When the numbers of the N TCIs start from 0, a TCI numbered n−1 is the $n^{th}$ TC in the N TCIs. In Embodiment 2 of this application, an example in which the numbers of the M time units, the numbers of the N DMRS ports, and the numbers of the N TCIs all start from 0 is used to describe the method provided in this embodiment of this application.

The preset cyclic order that the indexes of the M*N RVs satisfy may include indexes of RVs of all types (RVs with different indexes are RVs of different types). For example, referring to Table 2, assuming that N=2, the preset cyclic order that the indexes of the M*N RVs satisfy may be: 0→2→3→1→0→2→3→1→ . . . . That is, if an index of the first RV (that is, the first RV in the M*N RVs) sent in a time unit numbered 0 is 0, an index of the second RV (that is, the second RV in the M*N RVs) sent in the time unit numbered 0 is 2, an index of the first RV (that is, the third RV in the M*N RVs) sent in a time unit numbered 1 is 3, an index of the second RV (that is, the fourth RV in the M*N RVs) sent in the time unit numbered 1 is 1, an index of the first RV (that is, the fifth RV in the M*N RVs) sent in a time unit numbered 2 is also 0, and so on. Based on the cyclic order, the terminal can calculate, based on an index that is of an RV corresponding to first data sent in one time unit by using one DMRS port (or one TCI) and that is indicated by the second indication information, indexes of RVs that correspond to all DMRS ports (or all TCIs) and that are sent in all the time units. For example, it is assumed that N=2, and the second indication information indicates the index of the RV corresponding to the DMRS port (or the TCI) numbered 0 in the time unit numbered 0, and the index is 0. In this case, the index of the RV corresponding to the DMRS port (or the TCI) numbered 1 in the time unit numbered 0 is 2; the index of the RV corresponding to the DMRS port (or the TCI) numbered 0 in the time unit numbered 1 is 3; and the index of the RV corresponding to the DMRS port (or the TCI) numbered 1 in the time unit numbered 1 is 1.

The preset cyclic order that the indexes of the M*N RVs satisfy may alternatively be: 0→1→2→3→0→1→2→3→ . . . . In the descriptions of this embodiment of this application, "an $n^{th}$ RV sent in a time unit numbered m'" refers to "an RV corresponding to an $n^{th}$ piece of first data sent in the time unit numbered m'".

TABLE 2

| Index that is of an RV and that is indicated by | Index of an RV corresponding to first data sent by a network device by using a time unit numbered m' | | | |
|---|---|---|---|---|
| second indication information | m' mod 4 = 0 | m' mod 4 = 1 | m' mod 4 = 2 | m' mod 4 = 3 |
| 0 | 0, 2 | 3, 1 | 0, 2 | 3, 1 |
| 2 | 2, 3 | 1, 0 | 2, 3 | 1, 0 |
| 3 | 3, 1 | 0, 2 | 3, 1 | 0, 2 |
| 1 | 1, 0 | 2, 3 | 1, 0 | 2, 3 |

Note: The time unit numbered m' may also be explained as a time unit corresponding to an $m^{th}$ transmission in a plurality of transmissions, and m' is an integer greater than or equal to 0 and less than M.

The preset cyclic order that the indexes of the M*N RVs satisfy may alternatively include indexes of RVs of some types. For example, the preset cyclic order that the indexes of the M*N RVs satisfy may be: 0→1→0→1→0→1→ . . . .

The preset cyclic order that the indexes of the M*N RVs satisfy may alternatively include an index of an RV of a single type. For example, the preset cyclic order that the indexes of the M*N RVs satisfy may be: 0→0→0→0→ . . . .

In this case, during specific implementation, step 404 may include the following steps:

(11) The terminal combines, based on the second indication information, all the first data received in the M time units.

(12) The terminal decodes all the combined first data.

Optionally, during specific implementation, step (11) may include the following steps:

(21) The terminal determines, based on the second indication information and the preset cyclic order that the indexes of the M*N RVs satisfy, the index of the RV corresponding to each piece of first data in all the first data.

(22) The terminal combines all the first data based on the index of the RV corresponding to each piece of first data in all the first data.

During specific implementation of step (21), the terminal may calculate the indexes of the M*N RVs based on the second indication information and the preset cyclic order that the indexes of the M*N RVs satisfy. Using Table 2 as an example, assuming that the second indication information indicates the index of the first RV (that is, the first RV in the M*N RVs) sent in the time unit numbered 0, and the second indication information is used to indicate the index 0, the terminal may determine, based on Table 2, that the index of the second RV (that is, the second RV in the M*N RVs) sent in the time unit numbered 0 is 2, the index of the first RV (that is, the third RV in the M*N RVs) sent in the time unit numbered 1 is 3, the index of the second RV (that is, the fourth RV in the M*N RVs) sent in the time unit numbered 1 is 1, the index of the first RV (that is, the fifth RV in the M*N RVs) sent in the time unit numbered 2 is also 0, and so on.

Scenario 2: Indexes of RVs corresponding to the N pieces of first data sent by the network device in each of the M time units are the same, and the indexes of the RVs of the first data sent in the M time units satisfy a preset cyclic order.

In Scenario 2, the second indication information is used to indicate an index of one of M RVs (which is denoted as a second RV); an index of the first RV in the M RVs to an index of an $M^{th}$ RV in the M RVs satisfy a preset cyclic order; and an $m^{th}$ RV in the M RVs is an RV corresponding to N pieces of first data sent by the network device in an $m^{th}$ time unit in the M time units;

The second RV may be an RV corresponding to first data sent in the first time unit, may be an RV corresponding to first data sent in an $M^{th}$ time unit, or may be an RV corresponding to first data sent in another time unit. This is not limited in this embodiment of this application.

The preset cyclic order that the indexes of the M RVs satisfy may include indexes of RVs of all types. For example, referring to Table 3, the preset cyclic order that the indexes of the M RVs satisfy may be: 0→2→3→1→0→2→3→1→ . . . . That is, if an index of an RV corresponding to first data sent in a time unit numbered 0 is 0, an index of an RV corresponding to first data sent in a time unit numbered 1 is 2, an index of an RV corresponding to first data sent in a time unit numbered 2 is 3, an index of an RV corresponding to first data sent in a time unit numbered 3 is 1, an index of an RV corresponding to first data sent in a time unit numbered 4 is also 0, and so on. Based on the cyclic order, the terminal can calculate, based on an index that is of an RV corresponding to first data sent in one time unit and that is indicated by the second indication information, the indexes of the RVs corresponding to the first data sent in all the time units. For example, the second indication information indicates the index of the RV corresponding to the first data sent in the time unit numbered 0, and the index is 2. In this case, the index of the RV corresponding to the first data sent in the time unit numbered 1 is 3, the index of the RV corresponding to the first data sent in the time unit numbered 2 is 1, and the index of the RV corresponding to the first data sent in the time unit numbered 3 is 0.

The preset cyclic order that the indexes of the M RVs satisfy may alternatively be: 0→1→2→3→0→1→2→3 . . . .

TABLE 3

| Index that is of an RV and that is indicated by second indication information | Index of an RV corresponding to first data sent by a network device by using a time unit numbered m' | | | |
|---|---|---|---|---|
| | m' mod 4 = 0 | m' mod 4 = 1 | m' mod 4 = 2 | m' mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

The preset cyclic order that the indexes of the M RVs satisfy may alternatively include indexes of RVs of some types. For example, the preset cyclic order that the indexes of the M RVs satisfy may be: 0→1→0→1→0→1→ . . . .

The preset cyclic order that the indexes of the M RVs satisfy may alternatively include an index of an RV of a single type. For example, the preset cyclic order that the indexes of the M RVs satisfy may be: 0→0→0→ . . . .

In this case, during specific implementation, step 404 may include the following steps:

(31) The terminal combines, based on the second indication information, all the first data received in the M time units.

(32) The terminal decodes all the combined first data.

Optionally, during specific implementation, step (31) may include the following steps:

(41) The terminal determines, based on the second indication information and the preset cyclic order that the indexes of the M RVs satisfy, the index of the RV corresponding to each piece of first data in all the first data.

(42) The terminal combines all the first data based on the index of the RV corresponding to each piece of first data in all the first data.

During specific implementation of step (41), the terminal may calculate the indexes of the M RVs based on the second indication information and the preset cyclic order that the indexes of the M RVs satisfy. Using Table 3 as an example, assuming that the second indication information indicates the index of the RV corresponding to the first data sent in the time unit numbered 0, and the index of the RV is 0, the terminal may determine, based on Table 3, that the index of the RV corresponding to the first data sent in the time unit numbered 1 is 2, the index of the RV corresponding to the first data sent in the time unit numbered 2 is 3, the index of the RV corresponding to the first data sent in the time unit numbered 3 is 1, the index of the RV corresponding to the first data sent in a time unit numbered 4 is also 0, and so on.

Scenario 3: Each of the M time units satisfies a preset cyclic order. That one time unit satisfies a preset cyclic order means that indexes of RVs corresponding to N pieces of first data sent in the time unit satisfy the preset cyclic order.

In Scenario 3, the second indication information is used to indicate indexes of M RVs; the M RVs are in a one-to-one correspondence with the M time units; and an $m^{th}$ RV in the M RVs is an RV corresponding to one piece of first data sent by the network device in an $m^{th}$ time unit in the M time units.

Preset cyclic orders that different time units satisfy may be the same, or may be different. In this case, for descriptions of this part for each time unit, refer to related descriptions of Example 1 in Embodiment 1. Details are not described herein again.

In this case, during specific implementation, step 404 may include the following steps:

(51) The terminal combines, based on the second indication information, all the first data received in the M time units.

(52) The terminal decodes all the combined first data.

Optionally, during specific implementation, step (51) may include the following steps:

(61) The terminal determines, based on the second indication information and the preset cyclic order that each of the M time units satisfies, the index of the RV corresponding to each piece of first data in all the first data.

(62) The terminal combines all the first data based on the index of the RV corresponding to each piece of first data in all the first data.

During specific implementation of step (61), for each time unit, the terminal determines, based on the second indication information and the preset cyclic order that the time unit satisfies, RVs corresponding to the N pieces of first data sent in the time unit, and may determine the indexes of the RVs of the first data sent in the M time units.

Example 2

The second indication information is used to indicate an index of an RV corresponding to each piece of first data sent in each of the M time units.

In this case, during specific implementation, step 404 may include the following steps:

(71) The terminal combines, based on the second indication information, all the first data received in the M time units.

(72) The terminal decodes all the combined first data.

Optionally, during specific implementation, step (71) may include the following steps:

(81) The terminal determines, based on the second indication information, the index of the RV corresponding to each of the M*N pieces of first data.

(82) The terminal combines the M*N pieces of first data based on the index of the RV corresponding to each of the M*N pieces of first data.

During specific implementation of step (81), the terminal may perform no calculation, but directly determine, based on the second indication information, the index of the RV corresponding to each of the M*N pieces of first data.

In Example 1 and Example 2, the second indication information may be sent in the first time unit in the M time units, or may be sent in another time unit. The second indication information may be carried in DCI. When the function of the second indication information is described in Example 2, the DCI may be extended DCI. In Example 2, the DCI may include indexes of M*N RVs of a same TB, and the same TB herein is the same piece of second data.

It should be noted that, the solution in Scenario 1 in Example 1, the solution in Scenario 2 in Example 1, the solution in Scenario 3 in Example 1, and the solution in Example 2 in Embodiment 2 do not depend on step 401 to step 403, and all may be independently implemented. In the case of independent implementation, these independent solutions may also be combined with other solutions in the embodiments of this application, and this is not limited in this embodiment of this application.

Optionally, the method further includes the following step:

(91) The network device sends third indication information to the terminal. Correspondingly, the terminal receives the third indication information from the network device. The third indication information is used to indicate a quantity of DMRS ports used by the network device to send the first data in each of the M time units; or the third indication information is used to indicate a quantity of TRPs used by the network device to send the first data in each of the M time units, and the network device sends one piece of first data by using one TRP; or the third indication information is used to indicate a quantity of TCIs used by the network device to send the first data in each of the M time units; or the third indication information is used to indicate a quantity of the first data sent by the network device in each of the M time units; or the third indication information is used to indicate a quantity of different RVs corresponding to the first data sent by the network device in each of the M time units.

In this case, if the network device sends the N pieces of first data in each time unit, during specific implementation, step 403 may include: The terminal receives the N pieces of first data from the network device in each of the M time units based on the first indication information and the third indication information.

Specifically, the terminal may determine, based on the third indication information, the quantity of the first data sent by the network device in each time unit, to receive the first data in each time unit.

The first indication information and the third indication information may be same indication information, or may be different indication information.

When the first indication information and the third indication information are the same indication information, in the second possible implementation of the foregoing indication manner 1, the field may be set to a specific value, and the value may be used to indicate a quantity of DMRS ports used by the network device to send the first data in each of the M time units; or the value may be used to indicate a quantity of TRPs used by the network device to send the first data in each of the M time units, and the network device sends one piece of first data by using one TRP; or the value may be used to indicate a quantity of TCIs used by the network device to send the first data in each of the M time units; or the value may be used to indicate a quantity of the first data sent by the network device in each of the M time units; or the value may be used to indicate a quantity of different RVs corresponding to the first data sent by the network device in each of the M time units.

When the first indication information and the third indication information are the same indication information, the first indication information may include a plurality of fields. For example, one field in the first indication information is a switch field, and is used to indicate whether to use the space-time repeat transmission scheme. Another field is a value field, and the value field is used to indicate a quantity of DMRS ports used by the network device to send the first data in each of the M time units; or the value field is used to indicate a quantity of TRPs used by the network device to send the first data in each of the M time units, and the network device sends one piece of first data by using one TRP; or the value field is used to indicate a quantity of TCIs used by the network device to send the first data in each of the M time units; or the value field is used to indicate a quantity of the first data sent by the network device in each of the M time units; or the value field is used to indicate a quantity of different RVs corresponding to the first data sent by the network device in each of the M time units. For another example, in the first indication information, one field is used to indicate whether to use the time domain repeat transmission scheme, another field is used to indicate whether to use the spatial domain repeat transmission scheme, still another field may be set to a specific value, and the value may be used to indicate a quantity of DMRS ports used by the network device to send the first data in each of the M time units; or the value may be used to indicate a quantity of TRPs used by the network device to send the first data in each of the M time units, and the network device sends one piece of first data by using one TRP; or the value may be used to indicate a quantity of TCIs used by the network device to send the first data in each of the M time units; or the value may be used to indicate a quantity of the first data sent by the network device in each of the M time units; or the value may be used to indicate a quantity of different RVs corresponding to the first data sent by the network device in each of the M time units.

Any one or more of the first indication information, the second indication information, and the third indication information in Embodiment 2 may be carried in RRC signaling, MAC CE signaling, or DCI.

With reference to Embodiment 2, in another embodiment, for any time unit, any two of the N pieces of first data occupy different frequency domain resources. For example, for a time unit, if same TBs are simultaneously transmitted by using two TCIs, the two TCIs correspond to different frequency domain resources.

With reference to Embodiment 2, in another embodiment, for any time unit, when the N pieces of first data are sent in the time unit by using a plurality of DMRS ports, a correspondence between a TCI and first data may be a many-to-one correspondence, a one-to-many correspondence, or a one-to-one correspondence. When the N pieces of first data are sent in the time unit by using a plurality of TCIs, a correspondence between a DMRS port and first data may be a many-to-one correspondence, a one-to-many correspondence, or a one-to-one correspondence.

It should be noted that, the preset cyclic orders that the indexes of the RVs satisfy in the examples in Embodiment 1 and Embodiment 2 of this application are all examples, and during actual implementation, there may be another cyclic order. This is not limited in the embodiments of this application. In addition, the preset cyclic orders that the indexes of the RVs satisfy in Embodiment 1 and Embodiment 2 of this application may be specified in a protocol, or may be determined by the network device. If the preset cyclic orders that the indexes of the RVs satisfy in Embodiment 1 and Embodiment 2 of this application are determined by the network device, the network device may indicate, to the terminal, the preset cyclic order that the indexes of the RVs satisfy, so that the terminal determines, based on the preset cyclic order that the indexes of the RVs satisfy, the RV corresponding to the first data.

In the foregoing embodiments, an example in which the provided method is applied to downlink data (that is, the network device sends the first data by using the spatial domain repeat transmission scheme/space-time repeat transmission scheme) is used to describe the method provided in the embodiments of this application. During actual implementation, the foregoing method may also be applied to uplink data (that is, the terminal sends the first data by using the spatial domain repeat transmission scheme/space-time repeat transmission scheme). In this case, the actions performed by the network device in Embodiment 1 and Embodiment 2 may be performed by the terminal, and the actions performed by the terminal in Embodiment 1 and Embodiment 2 may be performed by the network device. In addition, a repeat transmission scheme to be used by the terminal may be indicated by the network device, or may be determined by the terminal and then notified to the network device.

The foregoing mainly describes the solutions in the embodiments of this application from a perspective of interaction between network elements. It may be understood that, to implement the foregoing functions, the network elements such as the network device and the terminal include corresponding hardware structures and/or software modules for performing the functions. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in the embodiments of this application, division into the units is an example, is merely logical function division, and there may be other division during an actual implementation.

Figure 9:
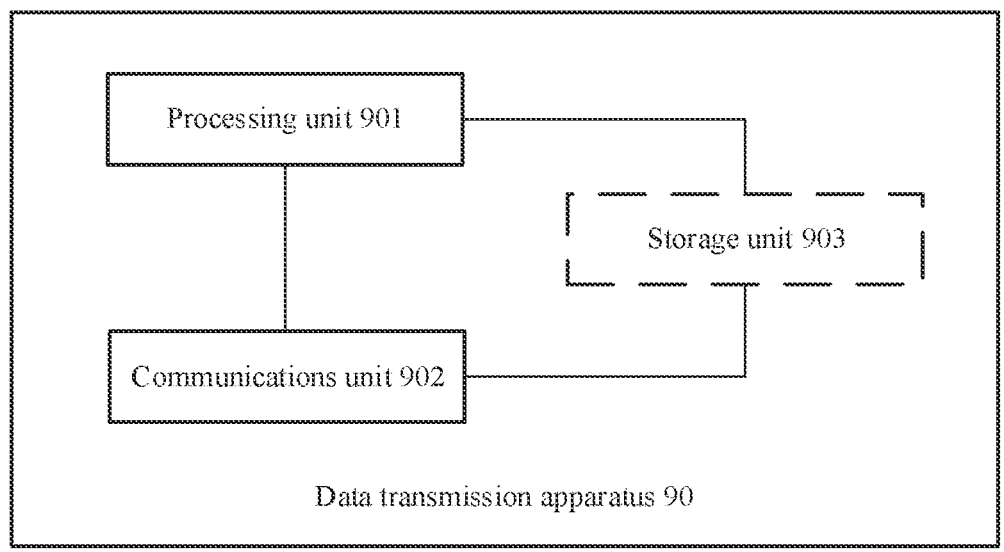
FIG. 9 is a schematic composition diagram of a data transmission apparatus according to an embodiment of this application.

When an integrated unit is used, FIG. 9 is a possible schematic structural diagram of the data transmission apparatus (denoted as a data transmission apparatus 90) in the foregoing embodiments. The data transmission apparatus 90 includes a processing unit 901 and a communications unit 902, and may further include a storage unit 903. The schematic structural diagram shown in FIG. 9 may be used to show a structure of the network device or the terminal in the foregoing embodiments.

When the schematic structural diagram shown in FIG. 9 is used to show the structure of the network device in the foregoing embodiments, the processing unit 901 is configured to control and manage an action of the network device. For example, the processing unit 901 is configured to support the network device in performing step 301, step 302, and step 305 in FIG. 3, and step 401, step 402, and step 405 in FIG. 4, and/or an action performed by the network device in another process described in the embodiments of this application. The processing unit 901 may communicate with another network entity through the communications unit 902, for example, communicate with the terminal shown in FIG. 3. The storage unit 903 is configured to store program code and data of the network device.

When the schematic structural diagram shown in FIG. 9 is used to show the structure of the network device in the foregoing embodiments, the data transmission apparatus 90 may be a network device, or may be a chip in a network device.

When the schematic structural diagram shown in FIG. 9 is used to show the structure of the terminal in the foregoing embodiments, the processing unit 901 is configured to control and manage an action of the terminal. For example, the processing unit 901 is configured to support the terminal in performing step 301 to step 305 in FIG. 3, step 401 to step 405 in FIG. 4, and/or an action performed by the terminal in another process described in the embodiments of this application. The processing unit 901 may communicate with another network entity through the communications unit 902, for example, communicate with the network device shown in FIG. 3. The storage unit 903 is configured to store program code and data of the terminal.

When the schematic structural diagram shown in FIG. 9 is used to show the structure of the terminal in the foregoing embodiments, the data transmission apparatus 90 may be a terminal, or may be a chip in a terminal.

When the data transmission apparatus 90 is the terminal or the network device, the processing unit 901 may be a processor or a controller, and the communications unit 902 may be a communications interface, a transceiver, a transceiver circuit, a transceiver apparatus, or the like. The communications interface is a collective name, and may include one or more interfaces. The storage unit 903 may be a memory. When the data transmission apparatus 90 is the chip in the terminal or the network device, the processing unit 901 may be a processor or a controller, and the communications unit 902 may be an input/output interface, a pin, a circuit, or the like. The storage unit 903 may be a storage unit (for example, a register or a cache) in the chip, or may be a storage unit (for example, a read-only memory or a random access memory) that is in the terminal or the network device and that is located outside the chip.

The communications unit may also be referred to as a transceiver unit. An antenna and a control circuit that have receiving and sending functions in the data transmission apparatus 90 may be considered as the communications unit 902 in the data transmission apparatus 90, and a processor that has a processing function in the data transmission apparatus 90 may be considered as the processing unit 901 in the data transmission apparatus 9X). Optionally, a component configured to implement a receiving function in the communications unit 902 may be considered as a receiving unit. The receiving unit is configured to perform the receiving step in the embodiments of this application. The receiving unit may be a receiver, a receiver circuit, or the like. A component configured to implement a sending function in the communications unit 902 may be considered as a sending unit. The sending unit is configured to perform the sending step in the embodiments of this application. The sending unit may be a transmitter, a sending circuit, or the like.

When an integrated unit in FIG. 9 is implemented in a form of a software functional module and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) or a processor (processor) to perform all or some of the steps of the methods in the embodiments of this application. The storage medium that stores the computer software product includes any medium that can store program code, for example, a USB flash drive, a removable hard disk, a read-only memory (ROM), a random access memory (RAM), a magnetic disk, or an optical disc.

A unit in the embodiments of this application may also be referred to as a module. For example, the processing unit may be referred to as a processing module.

Figure 10:
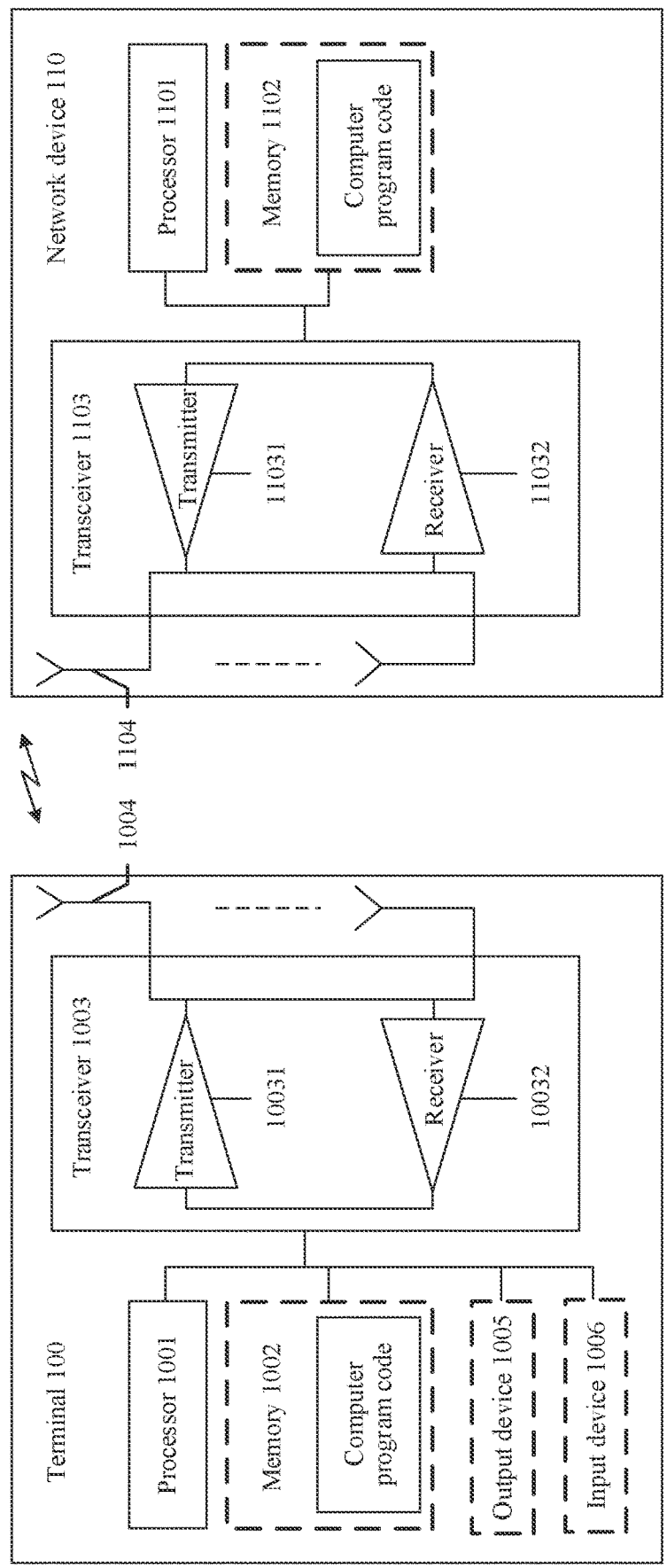
FIG. 10 is a schematic diagram of hardware structures of a network device and a terminal according to an embodiment of this application.

An embodiment of this application further provides a schematic diagram of hardware structures of a terminal (denoted as a terminal 100) and a network device (denoted as a network device 110). For details, refer to FIG. 10.

The terminal 100 includes at least one processor 1001 and at least one transceiver 1003. Optionally, the terminal 100 further includes at least one memory 1002. Optionally, the terminal 100 further includes at least one antenna 1004. Optionally, the terminal 100 may further include an output device 1005 and/or an input device 1006.

The processor 1001 is configured to control and manage an action of the terminal. For example, the processor 1001 is configured to support the terminal in performing step 301 to step 305 in FIG. 3, step 401 to step 405 in FIG. 4, and/or an action performed by the terminal in another process described in the embodiments of this application. The processor 1001 may communicate with another network entity through the transceiver 1003, for example, communicate with the network device shown in FIG. 3. The memory 1002 is configured to store program code and data of the terminal.

The processor 1001, the memory 1002, and the transceiver 1003 are connected through a bus. The processor 1001 may be a general-purpose central processing unit (CPU), a microprocessor, an application-specific integrated circuit (ASIC), or one or more integrated circuits configured to control program execution in the solutions in this application. The processor 1001 may alternatively include a plurality of CPUs, and the processor 1001 may be a single-core (single-core) processor or a multi-core (multi-core) processor. The processor herein may refer to one or more devices, circuits, and/or processing cores configured to process data (for example, computer program instructions).

The memory 1002 may be a ROM or another type of static storage device that can store static information and instructions, or a RAM or another type of dynamic storage device that can store information and instructions, or may be an electrically erasable programmable read-only memory (EE-PROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, this is not limited in this embodiment of this application. The memory 1002 may exist independently, and is connected to the processor 1001 through the bus. The memory 1002 may alternatively be integrated with the processor 1001. The memory 1002 may include computer program code. The processor 1001 is configured to execute the computer program code stored in the memory 1002, to implement the method provided in the embodiments of this application.

The transceiver 1003 may be any apparatus like a transceiver, and is configured to communicate with another device or communications network, for example, the Ethernet, a RAN, or a WLAN.

The output device 1005 communicates with the processor 1001, and may display information in a plurality of manners. For example, the output device 1005 may be a liquid crystal display (LCD), a light emitting diode (LED) display device, a cathode ray tube (CRT) display device, or a projector (projector). The input device 1006 communicates with the processor 1001, and may receive input of a user in a plurality of manners. For example, the input device 1006 may be a mouse, a keyboard, a touchscreen device, or a sensing device.

Optionally, the transceiver 1003 may include a transmitter 10031 and a receiver 10032. A component configured to implement a receiving function in the transceiver 1003 may be considered as the receiver 10032. The receiver 10032 is configured to perform the receiving step in the embodiments of this application. A component configured to implement a sending function in the transceiver 1003 may be considered as the transmitter 10031. The transmitter 10031 is configured to perform the sending step in the embodiments of this application.

The network device 110 includes at least one processor 1101 and at least one transceiver 1103. Optionally, the network device 110 further includes at least one memory 1102. Optionally, the network device 110 further includes at least one antenna 1104. The processor 1101 is configured to control and manage an action of the network device. For example, the processor 1101 is configured to support the network device in performing step 301, step 302, and step 305 in FIG. 3, and step 401, step 402, and step 405 in FIG. 4, and/or an action performed by the network device in another process described in the embodiments of this application. The processor 1101 may communicate with another network entity through the transceiver 1103, for example, communicate with the terminal shown in FIG. 3. The memory 1102 is configured to store program code and data of the network device.

The processor 1101, the memory 1102, and the transceiver 1103 are connected through a bus. For related descriptions of the processor 1101, the memory 1102, and the transceiver 1103, refer to the descriptions of the processor 1001, the memory 1002, and the transceiver 1003 in the terminal 100. Details are not described herein again.

Optionally, the transceiver 1103 may include a transmitter 11031 and a receiver 11032. A component configured to implement a receiving function in the transceiver 1103 may be considered as the receiver 11032. The receiver 11032 is configured to perform the receiving step in the embodiments of this application. A component configured to implement a sending function in the transceiver 1103 may be considered as the transmitter 11031. The transmitter 11031 is configured to perform the sending step in the embodiments of this application.

Optionally, the processor (for example, the processor 1101 or the processor 1001) may include a baseband processor and a central processing unit. The baseband processor is mainly configured to process a communication protocol and communication data. The central processing unit is mainly configured to: control the entire device, execute a software program, and process data of the software program. The processor integrates functions of the baseband processor and the central processing unit. A person skilled in the art may understand that the baseband processor and the central processing unit may be processors independent of each other, and are interconnected by using technologies such as a bus. The baseband processor may also be expressed as a baseband processing circuit or a baseband processing chip. The central processing unit may also be referred to as a central processing circuit or a central processing chip. A function of processing the communication protocol and the communication data may be embedded into the processor, or may be stored in the storage unit in a form of a software program, so that the processor executes the software program to implement a baseband processing function.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides an apparatus. The apparatus exists in a product form of a chip. The apparatus includes a processor, a memory, and a transceiver component. The transceiver component includes an input/output circuit. The memory is configured to store computer-executable instructions. The processor executes the computer-executable instructions stored in the memory, to implement any one of the foregoing methods. In this case, the method provided in the embodiments of this application may be performed by the chip.

An embodiment of this application further provides a communications system, including the foregoing network device and the foregoing terminal.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedures or the functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to this application without departing from the scope of this application. Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the scope of this application. In this way, this application is intended to cover these modifications and variations of this application provided that they fall within the scope of the claims of this application and equivalent technologies thereof.

What is claimed is:

1. A data transmission method, comprising:
receiving, by a terminal based on a first transmission scheme, data sent by a network device, wherein
the first transmission scheme is a data transmission scheme in which different redundancy versions (RV) of a same transport block (TB) are simultaneously transmitted by using two transmission configuration indicator (TCI) states, wherein indexes of the different RVs transmitted by using the two TCI states satisfy a preset cyclic order.

2. The method according to claim 1, wherein the two TCI states correspond to different frequency domain resources.

3. The method according to claim 1, wherein the first transmission scheme is configured by the network device using a radio resource control (RRC) signaling.

4. The method according to claim 1, wherein:
indexes of the different RVs transmitted by using the two TCI states are indicated by using downlink control information (DCI) delivered by the network device; and
a first RV indicated by the DCI corresponds to a first TCI, and a second RV indicated by the DCI corresponds to a second TCI.

5. The method according to claim 1, wherein indexes of the different RVs transmitted by using the two TCI states are one of: {0, 2}, {2, 3}, {3, 1}, and {1, 0}.

6. The method according to claim 1, wherein the method further comprises:
performing, by the terminal, combined decoding on data that is received by using the two TCI states.

7. A data transmission method, comprising:
sending, by a network device, data to a terminal based on a first transmission scheme, wherein
the first transmission scheme is a data transmission scheme in which different redundancy versions (RV) of a same transport block (TB) are simultaneously transmitted by using two transmission configuration indicator (TCI) states, wherein indexes of the different RVs transmitted by using the two TCI states satisfy a preset cyclic order.

8. The method according to claim 7, further comprising:
sending, by the network device, a radio resource control (RRC) signaling to the terminal, the RRC signaling is used to configure the first transmission scheme.

9. The method according to claim 7, wherein:
indexes of the different RVs transmitted by using the two TCI states are indicated by using downlink control information (DCI) delivered by the network device; and
a first RV indicated by the DCI corresponds to a first TCI, and a second RV indicated by the DCI corresponds to a second TCI.

10. The method according to claim 7, wherein indexes of the different RVs transmitted by using the two TCI states are one of: {0, 2}, {2, 3}, {3, 1}, and {1, 0}.

11. An apparatus, comprising:
a transceiver, configured to receive, based on a first transmission scheme, data sent by a network device, wherein
the first transmission scheme is a data transmission scheme in which different redundancy versions (RV) of a same transport block (TB) are simultaneously transmitted by using two transmission configuration indicator (TCI) states, wherein indexes of the different RVs transmitted by using the two TCI states satisfy a preset cyclic order.

12. The apparatus according to claim 11, wherein the first transmission scheme is configured by the network device using a radio resource control (RRC) signaling.

13. The apparatus according to claim 11, wherein:
indexes of the different RVs transmitted by using the two TCI states are indicated by using downlink control information (DCI) delivered by the network device; and
a first RV indicated by the DCI corresponds to a first TCI, and a second RV indicated by the DCI corresponds to a second TCI.

14. The apparatus according to claim 11, wherein indexes of the different RVs transmitted by using the two TCI states are one of: {0, 2}, {2, 3}, {3, 1}, and {1, 0}.

15. The apparatus according to claim 11, further comprising:
at least one processor; and
one or more memories coupled to the at least one processor and storing programming instructions for execution by the at least one processor to perform combined decoding on data that is received by using the two TCI states.

16. An apparatus, comprising:
a transceiver, configured to send data to a terminal based on a first transmission scheme, wherein
the first transmission scheme is a data transmission scheme in which different redundancy versions (RV) of a same transport block (TB) are simultaneously transmitted by using two transmission configuration indicator (TCI) states, wherein indexes of the different RVs transmitted by using the two TCI states satisfy a preset cyclic order.

17. The apparatus according to claim 16, wherein the two TCI states correspond to different frequency domain resources.

18. The apparatus according to claim 16, wherein the transceiver is further configured to send a radio resource control (RRC) signaling to the terminal, the RRC signaling is used to configure the first transmission scheme.

19. The apparatus according to claim 16, wherein:
indexes of the different RVs transmitted by using the two TCI states are indicated by using downlink control information (DCI) delivered by the apparatus; and
a first RV indicated by the DCI corresponds to a first TCI, and a second RV indicated by the DCI corresponds to a second TCI.

20. The apparatus according to claim 16, wherein indexes of the different RVs transmitted by using the two TCI states are one of: {0, 2}, {2, 3}, {3, 1}, and {1, 0}.

* * * * *